US006711131B1

(12) United States Patent
Shiobara

(10) Patent No.: US 6,711,131 B1
(45) Date of Patent: Mar. 23, 2004

(54) DATA TRANSMITTING APPARATUS, NETWORK INTERFACE APPARATUS, AND DATA TRANSMITTING SYSTEM

(75) Inventor: Yasuhisa Shiobara, Hoya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/392,461

(22) Filed: Sep. 9, 1999

(30) Foreign Application Priority Data

Sep. 10, 1998 (JP) .......................................... 10-256942

(51) Int. Cl.$^7$ .............................................. H04L 12/28
(52) U.S. Cl. ....................................... 370/235; 370/445
(58) Field of Search ................................ 370/229, 230, 370/231, 235, 351, 389, 395.5, 400, 401, 402, 403, 405, 445

(56) References Cited

U.S. PATENT DOCUMENTS

| 5,726,976 A | * | 3/1998 | Thompson et al. ......... 370/229 |
| 5,905,870 A | * | 5/1999 | Mangin et al. ............. 709/234 |
| 6,098,103 A | * | 8/2000 | Dreyer et al. ............... 709/234 |
| 6,272,147 B1 | * | 8/2001 | Spratt et al. ................ 370/447 |
| 2002/0048278 A1 | * | 4/2002 | Krishnakumar et al. .... 370/412 |

FOREIGN PATENT DOCUMENTS

| JP | 60-68741 | 4/1985 |
| JP | 61-10342 | 1/1986 |
| JP | 4-39819 | 6/1992 |

OTHER PUBLICATIONS

Yavatkar et al. "A Reservation–Based CSMA Protocol for Integrated Manufacturing Networks". IEEE. Aug. 1994. pp. 1247–1258.*
Sharon et al. "A CSMA/CD Compatible MAC for real–time Transmission based on varying Collision Intervals". IEEE. Mar. 29, 1998–Apr. 2, 1998. Pages 1265–1272.*
Kapsalis et al. "Implementation of a MAC–Layer Protocol (GIT–CSMA/CD) for Industrial LAN's and its Experimental Performance". IEEE. Dec. 1997. Pages 825–839.*
Kapsalis et al. "Performance Evaluation of a Hybrid MAC–Layer Protocol for Hard Real–time Industrial Networks". IEEE. Jul. 10, 1995–Jul. 14, 1995.*
Venkatramani et al. "Supporting Real–time Traffic on Ethernet". IEEE Real–Time Systems Symposium. Dec. 7–9, 1994. Pages 282–286.*
Watson et al. "The Demand Priority MAC Protocol". IEEE Network. Feb. 1995. Pages 28–34.*
Molle, Mart L. et al., "Reducing the Effects of Large Propagation Delays on High Speed IEEE 802.3 CSMA/CD Networks Using Collision Truncation," Proceedings of the $22^{nd}$ IEEE Conference on Local Computer Networks (LCN '97), IEEE 1997.
Venkatramani et al., "Design and Implementation of a real–time Switch for Segmented Ethernets," ICNP '97, IEEE, Oct. 28–31, 1997, pps. 152–161.
Chiueh et al., "Fault Handling Mechanisms in The RETHER Protocol," PRFTS '97, Dec. 15–16, 1997, pps. 1–7.

* cited by examiner

*Primary Examiner*—Chi Pham
*Assistant Examiner*—Derrick W Ferris
(74) *Attorney, Agent, or Firm*—Finnegan, Henderson, Farabow, Garrett & Dunner, L.L.P.

(57) ABSTRACT

A data transmitting apparatus comprises a connection section, a signal receiving section, a transmission right acquisition section, and a signal transmitting section. The data transmitting apparatus is connected to a communication system comprising devices that use protocols designed to prevent the collision of frames. Additionally, the data transmitting apparatus accomplishes communication among the devices, enabling transmitting stations incorporated in a network to exchange information. The data transmitting apparatus may transmit frames within a prescibed time, such as in real time, without being influenced by the data communication among the transmitting stations in the communication system.

26 Claims, 10 Drawing Sheets

REAL-TIME ETHERNET TRANSMITTNG STATION
(INCORPORATING A REAL-TIME INTERFACE)

REAL-TIME ETHERNET TRANSMITTNG STATION
(HAVING AN ADAPTER CARD)

ETHERNET TRANSMITTING STATION

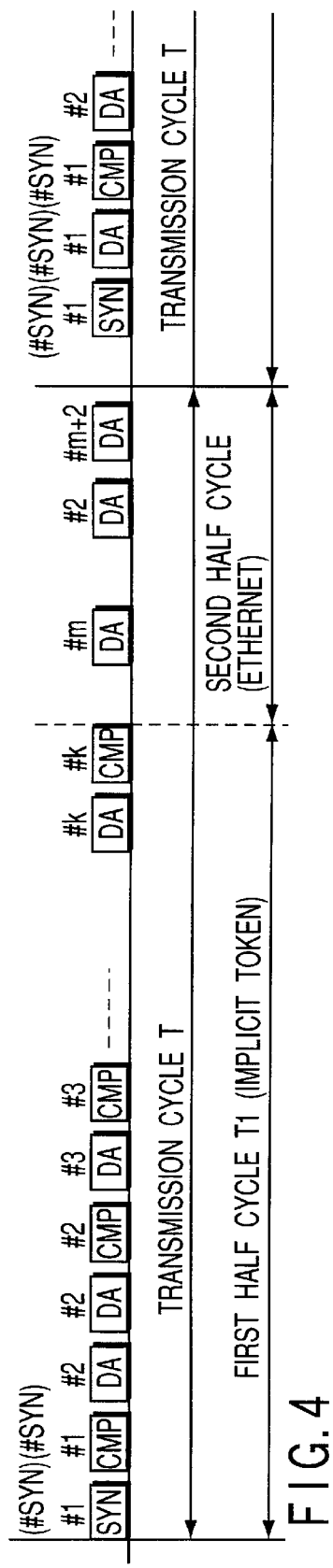
F I G. 4
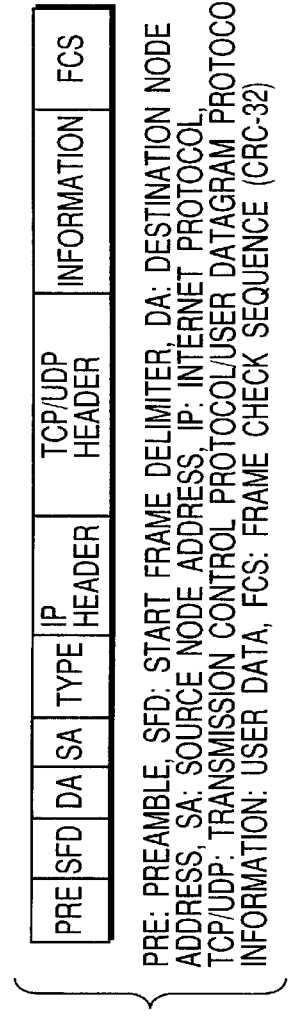
F I G. 5A
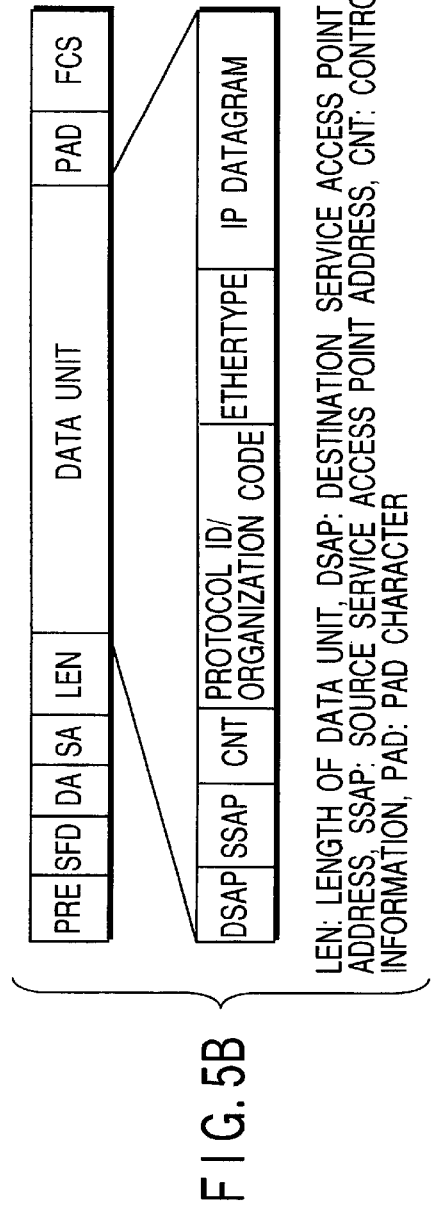
F I G. 5B

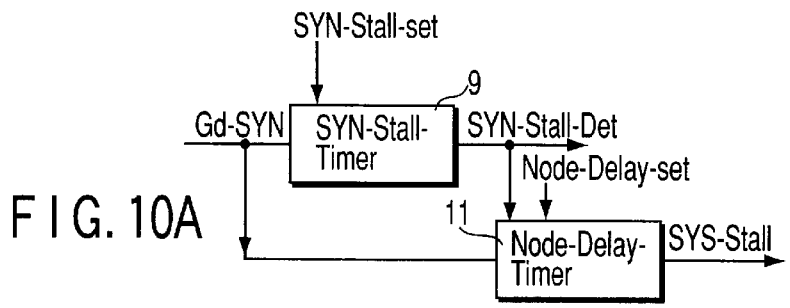
F I G. 10A
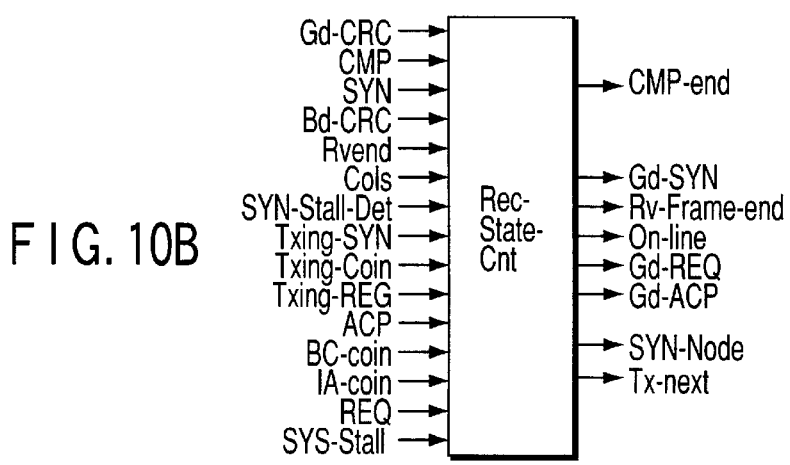
F I G. 10B
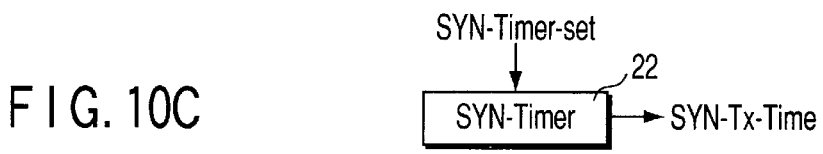
F I G. 10C
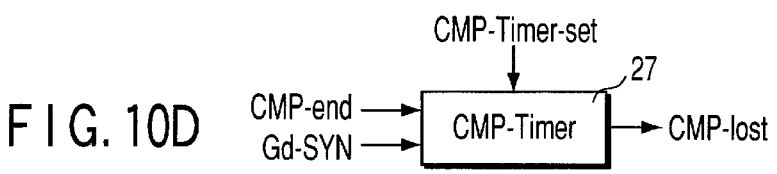
F I G. 10D
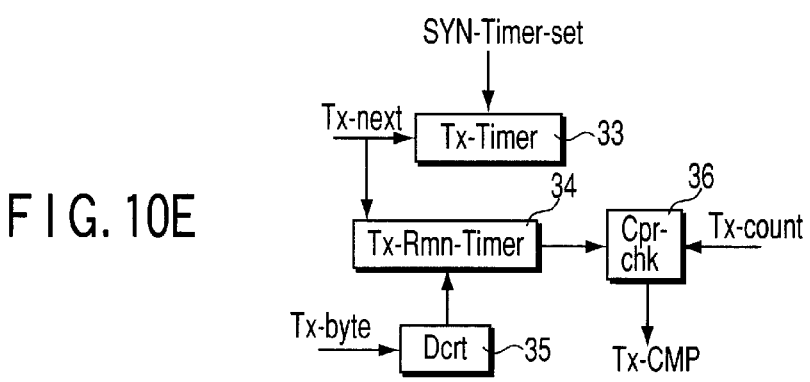
F I G. 10E

DATA TRANSMITTING APPARATUS, NETWORK INTERFACE APPARATUS, AND DATA TRANSMITTING SYSTEM

BACKGROUND OF THE INVENTION

The present invention relates to a network interface apparatus that can transfer data frames according to network standards, particularly to Ethernet standards, while monitoring the collision of data frames. This invention also relates to a data transmitting apparatus incorporating the network interface apparatus and a data transmitting system comprising data transmitting apparatuses of this type.

Network technology is applied to process information (in data-processing systems) or to control systems and the like (in monitoring/controlling systems). LAN (Local Area Network) is now widely utilized in information-processing systems. Particularly, Ethernet-based LAN and IEEE 802.2-based LAN (hereinafter collectively referred to as "Ethernet") have remarkably advanced. Ethernet is now used not only in information-processing systems, but also in monitoring/controlling systems. This owes to the increase of data transmitting speed and the performance enhancement of communications apparatus, both attained by technological advance, and also to the reduction in the price of standardized apparatuses, achieved by mass-production.

Various Ethernet LANs are actually installed. One of them is a network having a 10 Mps bus-type transmission path. Another is a network which is composed of the network and devices and repeaters or switching hub devices, and which therefore has a star-type transmission path. Each of these Ethernet LANs can be easily provided by using, in appropriate combination, Ethernet devices that have various transmission paths, such as a 10 Mbps path, a 100 Mbps path and a 1 GMbps path.

In Ethernet, which is used at present and will be used in the future, too, the CSMA/CD (Carrier Sense Multiple Access/Collision Detection) system is employed as the transfer control method. As long as the CSMA/CD system is used in Ethernet, Ethernet has the following disadvantage in connection with the timing of transmitting frames. No matter how much the speed of transferring data increases thanks to technical advances, it is impossible to predict accurately how long each transmitting station (i.e., data-transferring station) must wait before reliably transmitting station frames through the transmission path.

In the CSMA/CD system, each transmitting station monitors carriers on the common transmission paths. If the common transmission paths is vacant for a predetermined time, the transmitting station starts transmitting frames. If the common transmission path is not vacant, that is, if there are carriers on the paths the transmitting station does not transmit frames until the transmission path becomes vacant. Even after starting the transmission of frames, the transmitting station monitors the transmission path to determine if any frame it has transmitted is colliding with the frame transmitted from any other transmitting station. If the transmitting station detects a collision, it stops transmitting frames and tries to transmit the frames again upon laps of a prescribed time.

The more frequently the transmitting stations use the transmission path, the higher the possibility that the frames collide with one another in the transmission path. If any frame collides with another frame in the transmission path, the transmitting stations will hardly transmit frames reliably. In other words, each transmitting station cannot transmit frames by any time specified without fail. It cannot be predicted how long the transmitting station must wait before transmitting frames. Hence, Ethernet has but limited use in real-time control of an object or a process, which is achieved by exchanging information within a predetermined time.

As mentioned above, Ethernet is now used in monitoring/controlling systems, as well. Sufficient response speeds are secured by re-designing the system and operating the system in an adjusted scheme. Ethernet can therefore transmit information at high speed. Nonetheless, the traffic of information is minimized and the transmitting stations constituting the transmission system are reduced in numbers. Therefore, the monitoring/controlling systems need not operate at its maximum capacity, and does operate readily and reliably.

To exchange information reliably within a predetermined time, thus in real time fashion, a system that realizes token passing is proposed in, for example, Jpn. Pat. Appln. KOKOKU Publication No. 4-39819. This system known as "implicit token pass" performs implicit token passing, not effecting such explicit exchange of token frames as effected in a token passing system represented by the IEEE 802.2-based.

The data transmitting apparatus (implicit token path system) disclosed in Jpn. Pat. Appln. KOKAI Publication No. 4-39819 can use the Ethernet transmission control LSI. In this data transmitting apparatus, a special signal pattern is added to the frame format specified by Ethernet, whereby the timing of staring a token path is defined by the sync signal transmitted from a specific synchronous transmitting station. Each transmitting station can transmit frames, one after another, after the sync signal. This inhibits collision of frames, which inevitably occurs in the CSMA/CD system.

The data transmitting apparatus can utilize the LSI, connectors, cables, software resources and the like, which constitute Ethernet. The train of signals propagating through the transmission path has a frame format that differs from the one defined by Ethernet.

It is therefore impossible to incorporate a network of the implicit token path system into any Ethernet-based, data transmitting system, i.e., a network system that comprises repeaters, hub devices, Ethernet devices (e.g., switching hub devices) and Ethernet transmitting stations. The network of the implicit token path system can indeed use Ethernet-based devices, but it must be a data transmitting system different from and independent of Ethernet.

BRIEF SUMMARY OF THE INVENTION

The object of the present invention is to provide a data transmitting apparatus which is to be connected to a communication system comprising devices (e.g., Ethernet-based ones) using protocol designed to prevent collision of frames, and which accomplishes communication among the devices, enabling transmitting stations incorporated in a network (e.g., Ethernet) to exchange information. The other object of the invention is to provide a data transmitting apparatus, a network interface apparatus and a data transmitting system which can transmit frames within a prescribed time, thus in real time fashion, not influenced by the data communication among the transmitting stations provided in a communication system.

According to the first aspect of the invention, there is provided a data transmitting apparatus corresponding to one of a plurality of data transmitting apparatuses constituting a specific network. The data transmitting apparatus comprises: connection means connected to a communication system including the specific network, the communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, the signals transmitted through the data transmitting path and having a data format that accords with the protocol; transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that the data transmitting apparatus has acquired the transmission right, and for continuously transmitting signals even before the period for preventing collision of signals has elapsed, even when collision of signals occurs in the data transmission path, in order to prevent the signals to collide again in the data transmission path.

As long as the data transmitting apparatus holds the transmission right, it transmits signals, even if other signals exist in the data transmission path, thus causing the signals to collide with the other signals in the data transmission path. Further, the data transmitting apparatus continues to transmit signals without adjusting the transmission timing even when the signals collide with the other signals. Therefore, the apparatus can transmit data reliably. Since the transmission right is cyclically shifted from one data transmitting apparatus to another, each data transmitting apparatus can transmit frames within a predetermined time in the network, even if the apparatus is connected to an Ethernet terminal of an Ethernet-protocol system. The data transmitting apparatus can therefore operate in real-time fashion.

According to the second aspect of this invention, there is provided a network interface apparatus for use in one of a plurality of data transmitting apparatuses constituting a network. The network interface apparatus comprises: connection means connected to a communication system including the specific network, the communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed; signal receiving means for receiving signals transmitted from the terminal or any one of the other data transmitting apparatus, the signals transmitted through the data transmitting path and having a data format that accords with the protocol; transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that the data transmitting apparatus has acquired the transmission right, and for continuously transmitting signals even before the period for preventing collision of signals has elapsed, even when collision of signals occurs in the data transmission path, in order to prevent the signals to collide again in the data transmission path.

According to the third aspect of the present invention, there is provided a data transmitting system comprising. The data transmitting system comprises: a data transmission path; at least one terminal which operates in accordance with a protocol to transmit no signals while signals are transmitted through a data transmission path, to stop transmitting signals if the signals transmitted collide with other signals in the data transmission path, and to transmit the signals again after a period for preventing collision of signals has elapsed: and a plurality of data transmitting apparatuses, each comprising signal receiving means for receiving signals transmitted from the data transmission path in a data format that accords with the protocol, transmission right acquisition means for determining, at a specific timing, whether the data transmitting apparatus has acquired transmission right that should be given cyclically, from information representing an order in which the data transmitting apparatus should acquire the transmission right, and signal transmitting means for transmitting signals to the data transmission path in the data format that accords with the protocol, for transmitting signals, no matter whether signals exist in the data transmitting path, when the transmission right acquisition means determines that the data transmitting apparatus has acquired the transmission right, and for continuously transmitting signals even before the period for preventing collision of signals has elapsed, even when collision of signals occurs in the data transmission path, in order to prevent the signals to collide again in the data transmission path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a timing chart representing the timing of transmitting frames in the data transmitting system according to this invention;

FIG. 5A is a diagram showing the data configuration of an Ethernet frame based on the Ethernet standards;

FIG. 5B is a diagram showing the data configuration of an Ethernet frame based on the IEEE 802.3 standards;

FIGS. 10A to 10E are block diagrams showing, in detail, the network interface apparatus according to the present invention;

DETAILED DESCRIPTION OF THE INVENTION

Figure 1A:
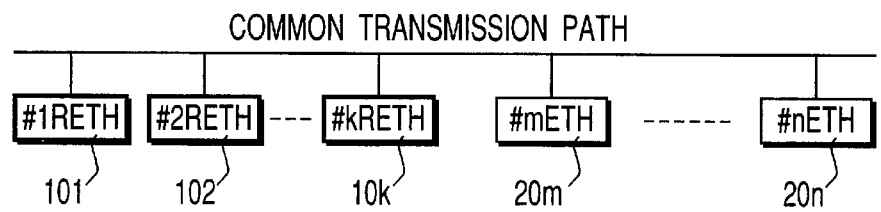
FIG. 1A is a diagram showing a data transmitting system according to this invention, which is a bus-type network.

Embodiments of the invention will now be described, with reference to the accompanying drawings.

First Embodiment
[Data Transmitting System]

The data transmitting system of this invention may be incorporated into a network system which meets the following two requirements. First, each transmitting station (data transmitting apparatus) should monitor the transmission path and should transmit no new frames if any other frame exists in the transmission path, thereby to prevent collision of frames. Second, if a frame transmitted from any station happens to collide with any other frame in the transmission path, the station should transmit the frame again at an appropriate timing, thereby to prevent collision of frames in the transmission path. The standard Ethernet and the IEEE 802.3 standard network, for example, satisfy both requirements. This invention can be applied to not only Ethernet, but also any network and any communication system that meet the two requirements.

In the present invention, a new network is incorporated in a network (called "base network") that meets the two requirements described above. In the new network incorporated in the base network (called "incorporated network"), each transmitting station has an additional function of giving the right to transmit frames to the next transmitting station. Hence, any transmitting station of the incorporated network can transmit a frame within a predetermined cycle. The frame transmitted from any transmitting stations of the incorporated network is of the same type as those used in the base network. The transmitting stations of the incorporated network therefore appears as if they were those of the base network, when viewed from outside. Thus, data communication can be achieved between any transmitting stations, no matter whether they belong to the base network or the incorporated network.

That is, the base network (including the incorporated network) accords, as a whole, with the standards of the base network. The transmitting stations of the incorporated network have the right to reliably transmit frames (hereinafter referred to as "frame transmission right") within a predetermined cycle, by performing the additional function. The transmitting stations provided outside the incorporated network transmit frames in accordance with the protocol of the base network. Therefore, they cannot use the transmission path while any transmitting station of the incorporated network is transmitting frames through the path. This makes no problems, in view of the standards of the base network.

How the transmitting stations of the incorporated network give the frame transmission right, one to the next transmitting station, thereby to transmit frames reliably, will be briefly explained below.

As described above, the transmitting stations of the base network transmit no new frames as long as frames are in the transmission path. If collision of frames occurs in the transmission path, they do not immediately transmit frames again (theoretically, they may do so, however). In other words, they do not transmit frames until the collision of frames ceases to exist. The transmitting stations of the incorporated network take the right to use the transmission path from the transmitting stations of the base network. While holding this right, each transmitting station of the incorporated network keeps occupying the transmission path.

That is, any transmitting station that has the frame transmission right transmits frames no matter whether or not frames exist in the transmission path. The frames transmitted from this station will collide with frames, if any, in the transmission path. The transmitting station having the frame transmission right may transmit new frames, and takes the right to use the path from the transmitting stations of the base network. This is possible because the transmitting stations of the base network do not transmit frames until the collision of frames ceases to exist or as long as frames exit in the transmission path. As long as one transmitting station of the incorporated network has the frame transmission right, the other transmitting station s of the incorporated network cannot take the right. Hence, the station having the right can reliably hold the right to use the transmission path.

Upon lapse of a period prescribed in the protocol, the transmitting station of the incorporated network, which has been holding the frame transmission right during that period, transfers the right to the next transmitting station of the incorporated network. Frames can thereby be smoothly transmitted through the transmission path during that period. To enable the transmitting stations of the base network to transmit frames during that period, a sub-period may be set within the period, during which no transmitting stations of the incorporated station can take the right to use the path from the transmitting stations of the base network. During the sub-period, any transmitting station can freely transmit frames in accordance with the protocol of the base network, whether it provided in or outside the incorporated network.

[Configuration of the Network]

The present embodiment is a network system (data transmitting system) of the type described in [Data Transmitting System], which comprises Ethernet network and a so-called real-time Ethernet. The Ethernet network is used as base network, and the real-time Ethernet is used as incorporated network.

Figure 1B:
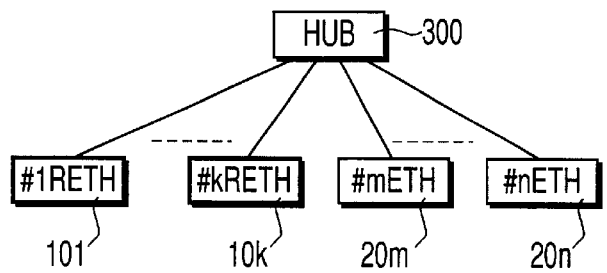
FIG. 1B is a diagram depicting a data transmitting system according to the invention, which is a star-type type network.
Figure 1C:
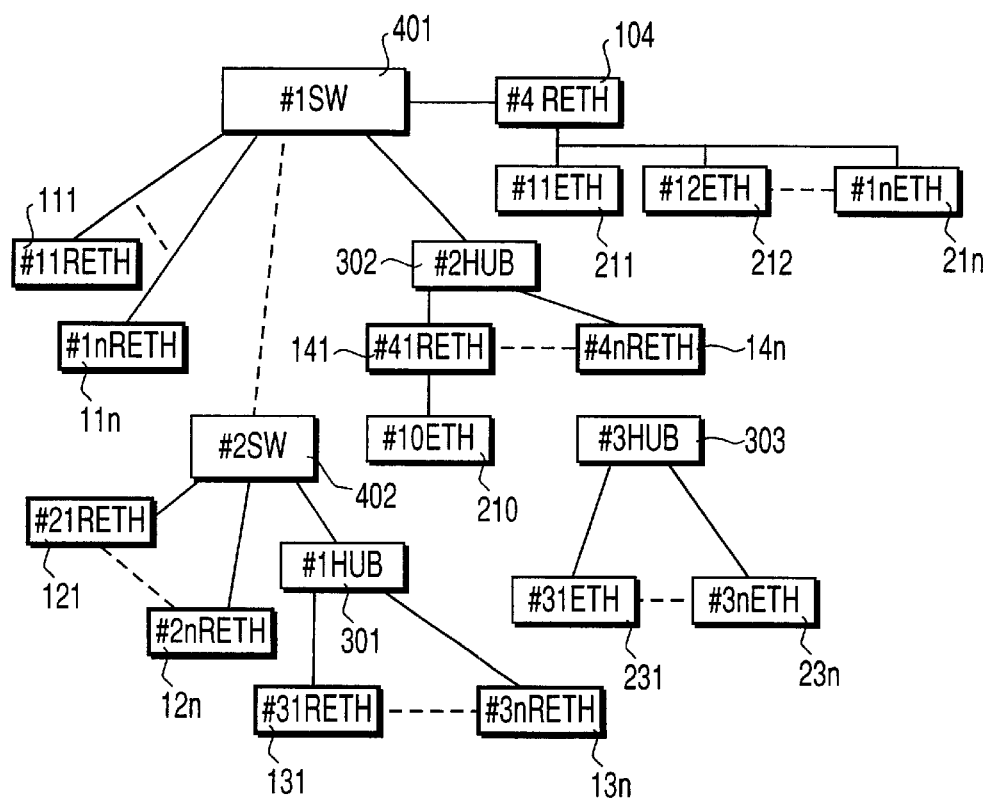
FIG. 1C is a diagram illustrating a data transmitting system according to the invention, which is a combination of a bus-type network and a star-type type network.

FIG. 1A shows a data transmitting system of this invention, which is a bus-type network. FIG. 1B depicts a data transmitting system of the invention, which is a star-type type network that incorporates the data transmitting system of the invention. FIG. 1C illustrates a data transmitting system of the invention, which comprises a bus-type network and a star-type type network connected to each other by switching hubs and the like.

In FIGS. 1A to 1C, numerals 101, 102, ... 10k, 111, 121, 131, 141, 11n, 12n, 13n, and 14n denote the transmitting stations (real-time Ethernet stations) #1RETH, #2RETH, ... #kRETH, #11reth, #21RETH, #31RETH, #41RETH, #1nRETH, #2nRETH, #3nRETH, and #4nRETH of a real-time Ethernet network (i.e., incorporated network). Reference numerals 20m ... 20n, 210, 211, 212, ... 21n, 231, ... 23n designate the transmitting stations (Ethernet transmitting stations) #nETH, ... #nETH, #10nETH, #11ETH, #12ETH, ... 1nETH of the Ethernet network (base network).

As described above, the transmitting stations (i.e., real-time Ethernet stations, hereinafter referred to as "real-time transmitting stations" or "RETH transmitting stations") of the incorporated network have the additional function according to the present invention. They can therefore serve as Ethernet transmitting stations, too. Nonetheless, the term "Ethernet transmitting station" (or "ETH transmitting station") used hereinafter shall mean a transmitting station that belongs to the base network proper, not meaning a real-time Ethernet station, unless otherwise specified.

In FIG. 1C, reference numerals 401 and 402 denote Ethernet switching hub devices #1SW and #2SW, and reference numerals 300, 301 and 302 denote Ethernet repeater hub devices #LHUB, #2HUB and #3HUB.

In the data transmitting systems of FIGS. 1A, 1B and 1C, the RETH ETH transmitting stations communicate with one another, that is, not only any RETH station with another RETH station and any ETH station with another ETH station, but also any RETH station with any ETH station, through the common transmission path L or through the bus common to the hub devices HUBs and switching hub devices SWs.

In the systems of FIGS. 1A and 1B, all transmitting stations can monitor the common transmission path, virtually without a time delay. The systems can therefore be of the type described above. In thee system of FIG. 1C, the RETH transmitting stations may fail to occupy the common transmission path in some cases, because the switching hub devices temporarily hold frames. Some measures are taken to make the RETH transmitting stations reliably occupy the common transmission path, as will be described later.

[Relation between Transmitting Stations and Interface Devices]

The present embodiment, which is a data transmitting system, incorporates comprises network interface apparatuses, thus providing a real-time Ethernet network. Each network interface is incorporated in one RETH transmitting station.

Figure 2A:
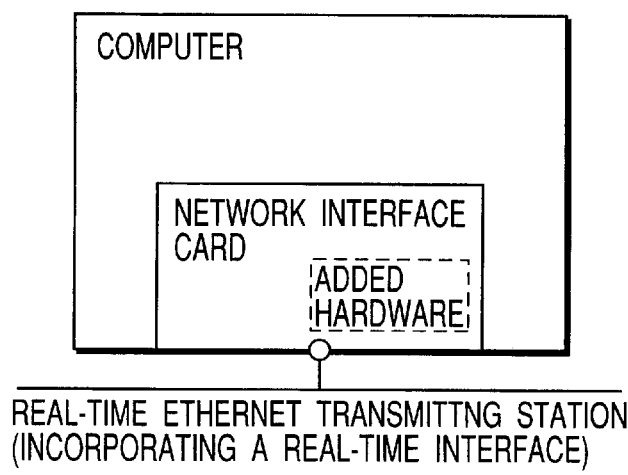
FIG. 2A is a diagram depicting a data transmitting apparatus (RETH) incorporating a network interface apparatus according to the present invention.
Figure 2B:
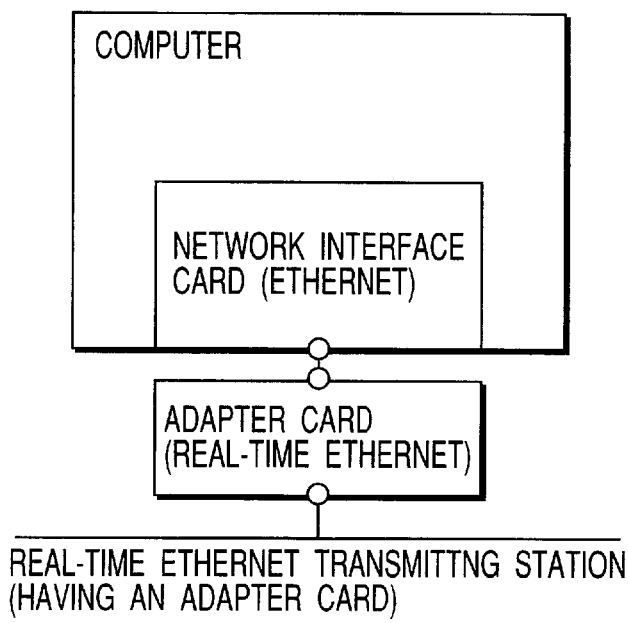
FIG. 2B is a diagram depicting a data transmitting apparatus (RETH) incorporating a network interface apparatus of the invention which is a combination of an Ethernet-based network interface device and an adapter device.

FIGS. 2A and 2B show two RETH transmitting stations, each incorporating an interface apparatus. More precisely, the RETH transmitting station of FIG. 2A comprises a computer and a network interface card. The computer, which is the main component of the station, incorporates the network interface card. The network interface card incorporates hardware and software that are designed to perform Ethernet functions. The card further incorporates hardware and software that are designed to perform real-time Ethernet functions.

The RETH transmitting station of FIG. 2B comprises a computer and a network interface card designed for Ethernet. An adapter card is connected to the network interface card. Thus, the computer, the network interface card, and the adapter card constitute this RETH transmitting station. The adapter card incorporates hardware and software, which are designed to perform real-time Ethernet functions.

Figure 2C:
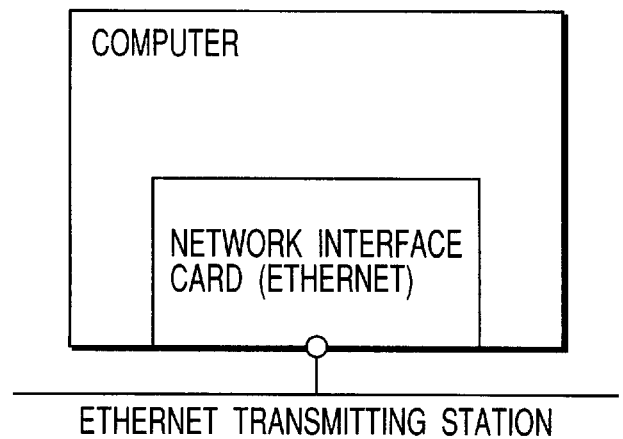
FIG. 2C is a diagram showing a data transmitting apparatus (ETH) dedicated to Ethernet, which incorporates a network interface apparatus for Ethernet.

FIG. 2C shows an ETH transmitting station. The ETH transmitting station comprises a computer and a network interface card set in the computer. The network interface card is designed for Ethernet.

As may be understood from the above, a transmitting station having hardware and software that perform real-time Ethernet functions can be a RETH transmitting station and an ETH transmitting station. Whether it operates as a RETH station or an ETH transmitting station depends on the values preset in it. For the same of simplicity, any transmitting station that has hardware and software that may perform real-time Ethernet functions is regarded as a RETH transmitting station in some cases.

[Operation of the Data Transmitting System]

The operation of the data transmitting system, which comprises an Ethernet network and a real-time Ethernet network incorporated in the Ethernet network, will be outlined below.

Figure 3:
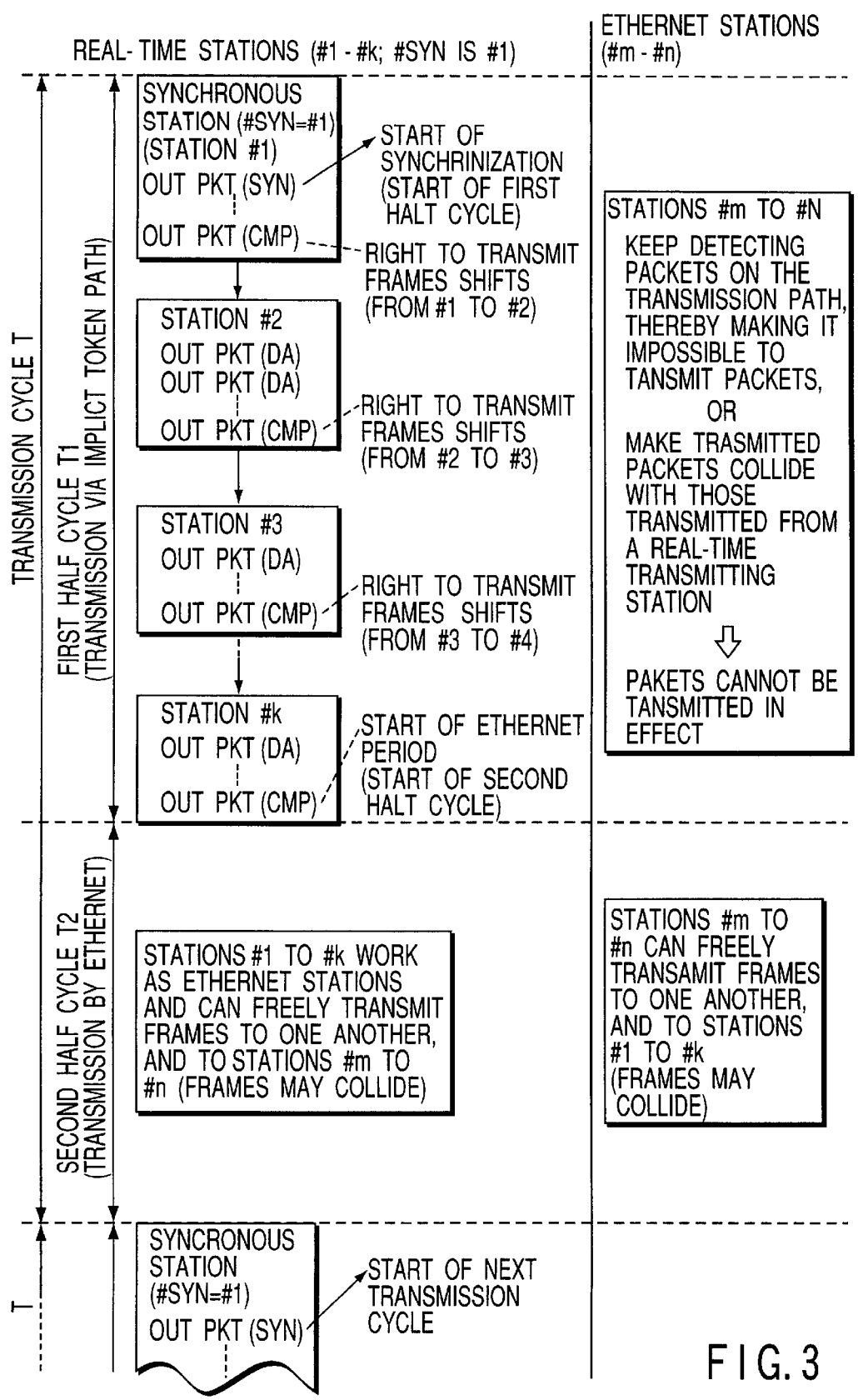
FIG. 3 is a diagram explaining the data communication between a real-time Ethernet station and an Ethernet transmitting station.

FIG. 3 is a diagram explaining how the Ethernet network and the real-time Ethernet network operate. FIG. 4 is a timing chart showing the timing of transmitting frames in the data transmitting system according to this invention.

As can be understood from FIGS. 3 and 4, each transmission cycle T of the real-time Ethernet network is divided into the first half cycle T1 and the second half cycle T2. Each of the RETH transmitting stations is given the frame transmission right, at least once during the first half cycle T1. In the second half cycle T2, any transmitting station that functions as an Ethernet transmitting station (i.e., any RETH station and any ETH station) is given the frame transmission right. Since any transmitting station can receive Ethernet frames, it can be a destination of frames. The lengths of the half cycles T1 and T2 are arbitrary. When all transmitting stations of the data transmitting system are RETH stations, the second half cycle T2 may be set to 0, that is, T2=0.

Assume that the data transmitting system of FIGS. 3 and 4 comprises real-time Ethernet stations #LRETH to #krRETH and Ethernet transmitting stations #mETH to #nETH, as is illustrated in FIG. 1A.

Then, one of the RETH stations is a synchronous transmitting station in the real-time Ethernet network. The transmission cycle T starts when the synchronous transmitting station transmits a sync signal frame PKT(SYN). Thereafter, when the RETH station that has the frame transmission right outputs a transmission-completion signal frame PKT(CMP) or when a predetermined time is reached, the frame transmission right shifts to the next RETH station. As will be described later, both the sync signal frame and the transmission-completion signal frame are Ethernet frames and serve as control frames for controlling the real-time Ethernet network.

In the data transmitting system of FIGS. 3 and 4, wherein the transmitting station #1RETH is the synchronous transmitting station, the frame transmission right shifts from the station #1RETH to the station #2RETH, and hence to the station #3RETH, and so forth. Finally, the right shifts to the station #kRETH. Any RETH station can transmit frames as long as it holds the frame transmission right. When the RETH station transmits all frames it should transmit, it transfers the right to the next RETH station even if the time for which it can hold the right has not expired yet. The time for which the RETH station can transmit frames is not a fixed one. Rather, the time is set so that the shortest possible time for which the next RETH station can transmit frames while holding the frame transmission right.

Assume that the first half cycle T1 is 5U (where U is a unit of time) and that five RETH stations need to transmit frames during the first half cycle T1. In this case, each RETH station has time U, on average, to transmit frames. If the first of the five RETH stations finish transmitting frames, spending 0.5U, the second RETH station will have 1.5U to transmit frames, until time of 2U expires from the time when the first RETH started transmitting frames. If the second RETH station finishes transmitting frames, spending only 1.2U, the third RETH station will have 1.8U to transmit frames, until time of 3U expires from the time when the first RETH started transmitting frames. Thus, the shorter time each RETH station spends to transmit frames, the longer time the next RETH station will have to transmit frames.

In the first half cycle T1, the RETH station holding the frame transmission right keeps issuing a preamble, thereby taking from another RETH station the frame transmission right through the transmission path. The preamble is used to generate a clock signal, which the other RETH station will use to receive the frames transmitted through the transmission path. The preamble has a length of 64 bits in most cases. The RETH station holding the frame transmission right continues to issue the preamble, thus causing collisions of frames in the transmission path and thereby occupying the transmission path. The preamble may have a longer length than 64 bits. If this is the case, it will remain an Ethernet frame. Since the RETH station transmits Ethernet frames in the first half cycle T1, it does not matter which station the frames are transmitted to, a RETH station or an ETH station.

In the second half cycle T2, the RETH stations and the ETH stations transmit frames in accordance with, in principle, the Ethernet protocol. No station acquires the frame transmission right from any other station in the second half cycle T2. A subscription-requesting signal frame REQ, a subscription-accepting signal frame ACP and the like can be transmitted to the real-time Ethernet network in the second half cycle T2.

When the second half cycle T2 terminates, the transmission cycle T terminates. Then, the synchronous transmitting station transmits a sync signal fame, and the next transmission cycle T starts.

[Frame Configuration and Information Contained in Frame]

One of the characterizing features of this invention is that the frame standards of the base network are utilized without being modified, making the frames transmitted from the incorporated network appears the same as the frames transmitted from the base network.

In the data transmitting system of FIGS. 3 and 4, the base network is the Ethernet. The frames transmitted in the base network are therefore based on the Ethernet standards or IEEE 802.3 standards. FIG. 5A shows the data configuration of an Ethernet frame based on the Ethernet standards. FIG. 5B shows the data configuration of an Ethernet frame based on the IEEE 802.3 standards.

In FIGS. 5A and 5B, PRE is a preamble (dummy frame), SFD stands for "Start Frame Delimiter," DA is a destination node address, and SA is a source node address. IP is an abbreviation for "Internet Protocol," TCP/UDP for "Transmission Control Protocol/User Datagram Protocol," and FCS for "Frame Check Sequence (CRC32)." Further, Information is user data, Len means the length of a data unit, DSAP stands for "Destination Service Access Point Address," SSAP stands for "Source Service Access Point Address," CNT is control information, and Pad is a pad character.

The frames each transmitting station transmits are all Ethernet frames illustrated in FIGS. 5A and 5B. The type field of each frame based on the Ethernet standards, or the Ethertype field (hereinafter referred to as "type field") of each frame based on the IEEE 802.3 standards contains the information that designates which protocol should be used to process the frame, IP, ARP, IBM protocol, or the like. For example, the information designating the protocol of the real-time Ethernet may be contained in the type field of the frame.

The frame transmitted from any RETH station may be one that must be processed to achieve data communication in the real-time Ethernet network. More precisely, the frame may be a control frame (e.g., a sync signal frame, a transmission-completion signal frame, or a sync/transmission-completion signal frame, which will be described later). Alternatively, the frame transmitted from the RETH station may be subscription-requesting signal frame requesting, a subscription-accepting signal frame, or the like, which is not a control frame and which requests for or indicates a process related to the real-time Ethernet network. In either case, the information designating the protocol of the real-time Ethernet is contained in the type field of the frame. In principle, it is sufficient to record, in the type field, only an identifier that accords with the real-time Ethernet protocol, and other necessary information is recorded in the parts of the frame other than the type field. Nonetheless, in the data transmitting system of FIGS. 3 and 4, various items of information, which serve to realize the real-time Ethernet protocol, are contained in the type field of the Ethernet frame.

In accordance with the Ethernet standards, the control identifiers (ID numbers) of a sync signal SYN, a transmission-completion signal CMP, a sync/transmission-completion signal SYNCMP, a subscription-requesting signal REQ and a subscription-accepting signal ACP, respectively, are recorded in the type field of each frame. The control identifier (ID number) must be one different from IP, APR and the like already used.

In accordance with the IEEE 802.3 standards, too, the control identifiers (ID numbers) of a sync signal SYN, a transmission-completion signal CMP, a sync/transmission-completion signal SYNCMP, a subscription-requesting signal REQ and a subscription-accepting signal ACP, respectively, are recorded in the type field (i.e., Ethernet type field) of each frame. The control identifier (ID number) must be one different from IP, APR and the like already used, as in the Ethernet standards.

As described above, it is sufficient to record, in the type field, only an identifier that accords with the real-time Ethernet protocol. In view of this, only a control identifier RETH of the real-time Ethernet protocol may be recorded in the type field or Ethernet type field, while the sync signal SYN, transmission-completion signal CMP, sync/transmission-completion signal SYNCMP, subscription-requesting signal REQ, subscription-accepting signal ACP, and other information may be contained in other fields of the frame, for example, in the IP header, IP datagram, Information, and the like. In this case, the control identifier RETH, the signals SYN, CMP, SYNCMP, REQ, ACP, and the other information must be recorded in such a manner that the frame remains an Ethernet frame.

To transmit control frames, such as a sync signal frame, a transmission-completion signal frame and the like, in the real-time Ethernet, the control frames must contain many additional pieces of information. Thus, the following measures are taken.

The sync signal frame needs to contain the information representing the number of RETH stations subscribed to the real-time Ethernet network. In the present embodiment, a field for storing this information is set in the option word provided in the option IP protocol header (i.e., the IP header shown in FIG. 5A or the IP datagram shown in FIG. 5B).

Figure 7A:
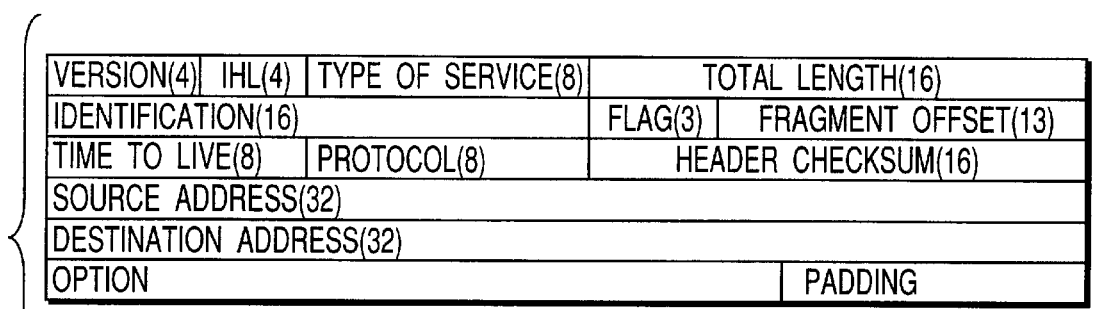
FIG. 7A is a diagram depicting the data configuration of an IP datagram.
Figure 7B:
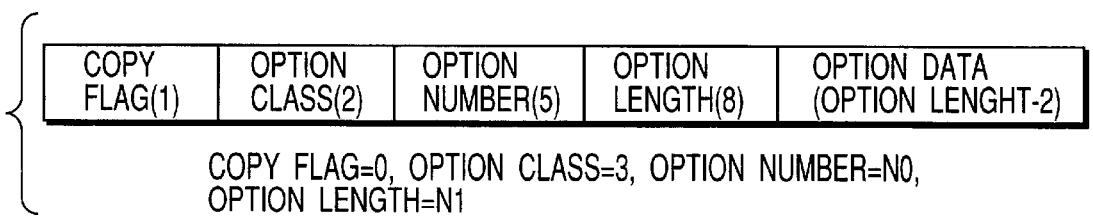
FIG. 7B is a diagram showing the data configuration of the option field included in the IP datagram.

FIG. 7A shows the data configuration of the IP header (IP datagram), and FIG. 7B shows the data configuration of the option field included in the IP header (IP datagram).

The information representing the number of subscribed RETH stations is contained in the option data (FIG. 7B) included in Option shown in FIG. 7A. Each RETH station extracts this field from a frame to know how many transmitting stations have been subscribed to the real-time Ethernet network.

Further, the sync signal frame must contain the logic transmitting station number assigned to the synchronous transmitting station. Moreover, it must contain a slot count value, which controls the transfer of the frame transmission right. The transmission-completion signal frame must contain not only the slot count value for the synchronous transmitting station, but also the slot count value for any RETH station that has transmitted frames.

Figure 6:
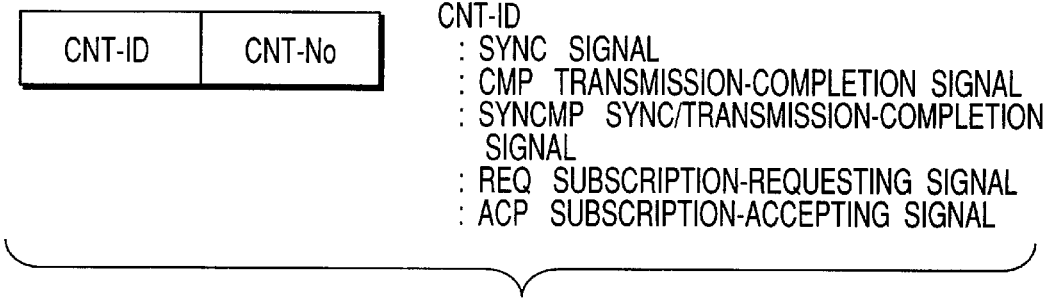
FIG. 6 is a diagram illustrating an example of the type field included in an Ethernet frame to be transmitted in real time.

The logic transmitting station number and the slot count value are set in the field Type shown in FIG. 5A or in the field Ethernet Type shown in FIG. 5B. The field, in which the logic transmitting station number and the slot count value are set, is defined by some of the 16-bit control identifier field shown in FIG. 6. The other bits of the control identifier field define the control identifier.

The logic transmitting station number and the slot count value may be set in other fields. For example, the logic transmitting station number of the synchronous transmitting station or the slot count value of the transmission-completion signal frame may be contained in the option word of the IP header (IP datagram) illustrated in FIG. 7A. More specifically, either the logic transmitting station number or the slot count value may be contained in the option data (FIG. 7B) included in option shown in FIG. 7A.

The number of transmitting stations subscribed and the logic transmitting station number of the synchronous transmitting station, which are to be contained in the sync signal frame, may be set in other fields. For example, they may be set in the field Type shown in FIG. 5A or in the field Ethernet Type shown in FIG. 5B. The field, in which the number of subscribed transmitting stations and the logic transmitting station number are set, is defined by some of the 16-bit control identifier field shown in FIG. 6. The other bits of the control identifier field define the control identifier. The field in which to set the logic transmitting station number of the synchronous transmitting station is provided in the same way as described above. Nonetheless, the logic transmitting station number is represented by a small amount of information. That is, the station number is an always implicit value, e.g., "0." It is therefore easy to set the number of subscribed transmitting stations and the logic transmitting station number within a limited area (16-bit area) provided in the field Type or the field Ethernet Type.

[Overall Operation in the Network System]

Figure 8A:
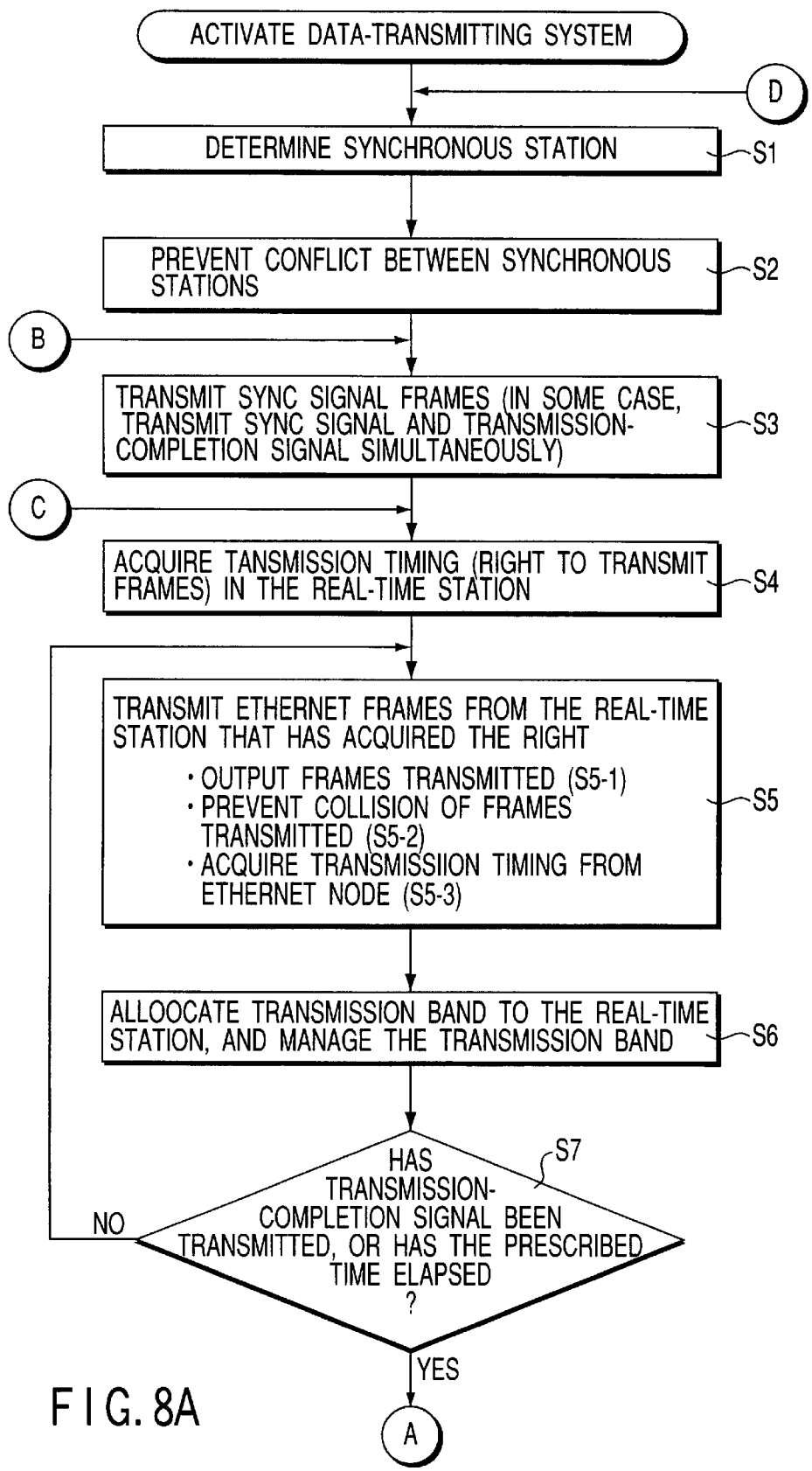
FIGS. 8A and 8B are a flow chart for explaining the operation of the data transmitting system according to the present invention.
Figure 8B:
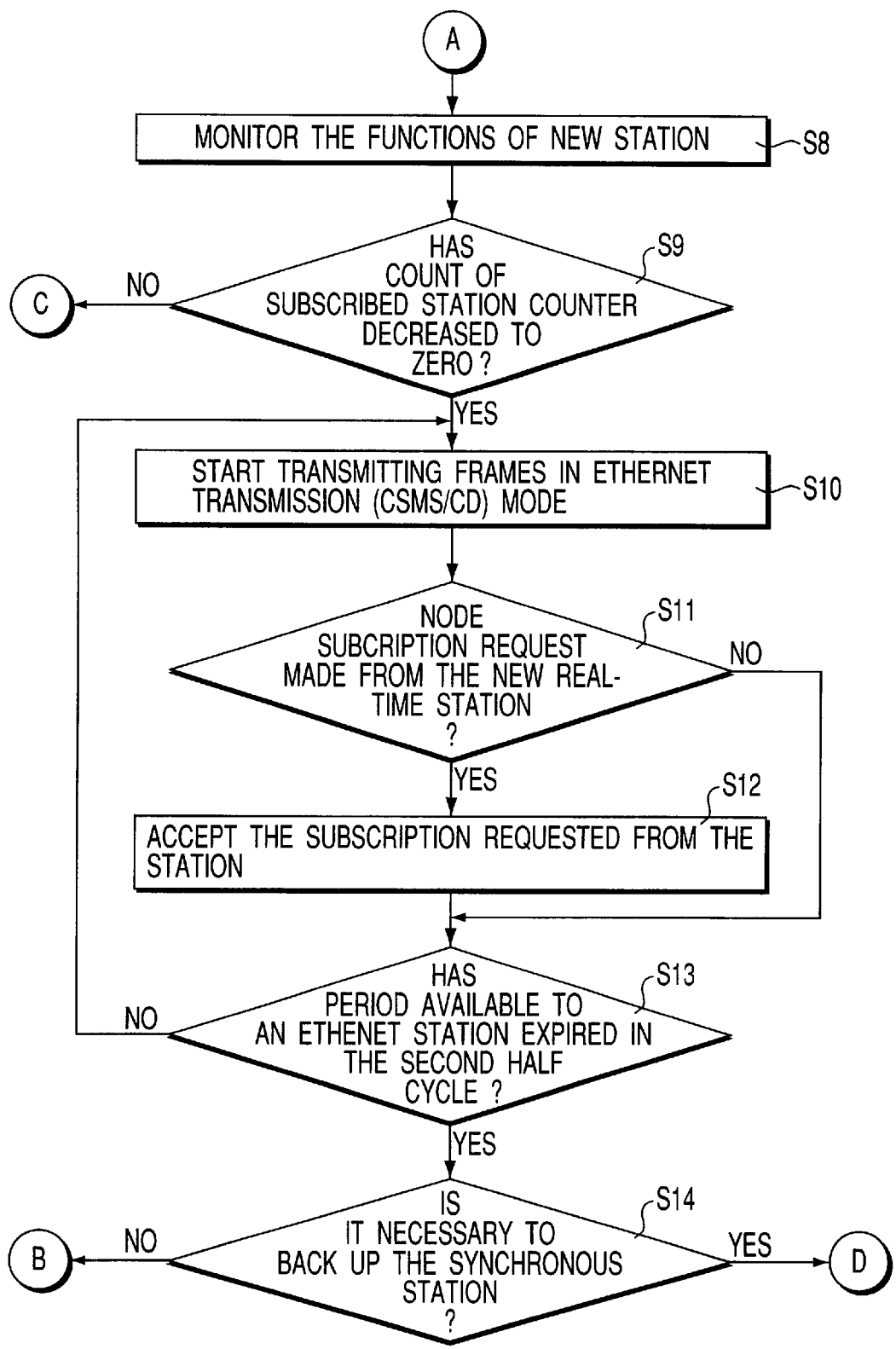

FIGS. 8A and 8B are a flow chart for explaining the overall operation performed in the data transmitting system according to this invention.

First, the operation performed in the network of the configuration shown in FIGS. 1A and 1B will be explained, with reference to FIGS. 8A and 8B. Then, the operation performed in the network of the configuration shown in FIG. 1C will be explained. Operation in the Network Shown in FIGS. 1A and 1B:

Step S1:

First, the data transmitting system is activated, and a synchronous transmitting station is determined in the real-time Ethernet network.

Immediately after the system has been activated, no synchronous transmitting station is determined. A transmitting station which has hardware and software and which can therefore be a real-time Ethernet station may be set as a RETH station. If so, this transmitting station waits for a sync signal frame. The sync signal frame is one that is expected to arrive cyclically. This frame has a destination address which is a specific multi cast address. It is an Ethernet frame, which has a sync signal recorded in a specific field and functioning as a specific control identifier. More precisely, a control identifier SYN is stored in the field TYPE or the like. Alternatively, a control identifier RETH is stored in the field TYPE or the like, and a control identifier SYN is stored in any other specific field.

The transmitting station waiting for a sync signal frame may not detect a sync signal frame within a time that corresponds to one-cycle time during which a sync signal frame arrives (i.e., the transmission cycle T). If this is the case, the transmitting station transmits an Ethernet frame (i.e., sync signal frame) upon lapse of a predetermined period of time. The Ethernet frame, thus transmitted, has a destination address, or a specific multi cast address designating the station that is to function as a RETH station, and is an Ethernet frame (i.e., sync signal frame) containing a sync signal stored in the specific field. It should be noted that the predetermined period of time, which defines the timing of transmitting the sync signal frame, is determined for each transmitting station.

If the sync signal frame transmitted from any transmitting station collides with no other frames in the transmission path, the transmitting station will be designated as the synchronous transmitting station. Once so designated, the transmitting station cyclically transmits an Ethernet frame containing a sync signal (i.e., a sync signal frame).

Step S2:

Each RETH station can identify Ethernet frames, each having a destination address which is a specific multi cast address and also containing a sync signal which is recorded in a specific field and which functions as a specific control identifier, as described above.

In Step S1, any transmitting station is designated as a synchronous transmitting station when the sync signal frame from the transmitting station is transmitted without colliding with other frames in the transmission path. If the station tires to output sync signal frames even after it has been designated as such, the real-time Ethernet network cannot operate at all.

Any RETH station other than the one designated in Step S1 as a synchronous transmitting station may receive a sync signal frame. In this case, the data transmitting system is assumed to become operative when the sync signal frame is completely received. The station that has received the sync signal frame is therefore set into on-line state. The station set to work as a synchronous transmitting station is reset. While set to work as such, the station cannot transmit frames each containing a sync signal.

Thus, all RETH stations become able to transmit data in the real-time Ethernet network.

Step S3:

The synchronous transmitting station starts transmitting sync signal frames, each during one transmission cycle, by using the specific multi cast address designating all other RETH stations. At this time, the specific field of each sync signal frame contains at least a sync signal used as a control identifier, a logic transmitting station number identifying the synchronous transmitting station, and the number of RETH stations subscribed to the real-time Ethernet network.

Like the other RETH stations, the synchronous transmitting station transmits data frames in Steps S5 to S7, which will be described later. If the synchronous transmitting station has no data frames to transmit, it operates as will be explained below.

That is, the synchronous transmitting station transmits an Ethernet frame having a sync/transmission-completion signal, instead of a sync signal frame. The sync/transmission-completion signal is indicated as "SYNCMP" in FIG. 6. The signal SYNCMP is a combination of a sync signal and a transmission-completion signal CMP. When the synchronous transmitting station has no data to transmit, it needs to transmit only one frame, not two frames, i.e., a sync signal frame and a transmission-completion frame. In other words, a new transmission cycle can be started and the frame transmission right can be shifted, merely by transmitting a single frame.

Step S4:

The count of the slot counter provided in each RETH station reaches a predetermined value when the RETH station transmits a transmission-completion signal frame or when the predetermined time is reached as explained in [Operation of the Data Transmitting System]. At this time, the RETH station acquires the frame transmission right. The transmission-completion signal frame has a destination address which is a specific multi cast address. This frame is an Ethernet frame that has a transmission-completion signal CMP and a slot counter value. The signal CMP is stored, as a specific control identifier, in the specific field of the transmission-completion signal frame. The transmission-completion signal frame indicates that the RETH station has no frames to transmit after transmitting the transmission-completion signal frame.

In any RETH station that waits for the frame transmission right, the slot counter is reset when the RETH station receives a sync signal SYN from the synchronous transmitting station. The count of the slot counter is changed when the RETH station receives a transmission-completion signal frame transmitted from any other RETH station which has the frame transmission right and which can therefore transmit frames. Thus, the slot count value contained in the transmission-completion signal frame is set into the slot counter of the RETH station waiting for the frame transmission right, and is incremented by one, providing a new slot count value.

If the new slot count value coincides with the slot number given to the RETH station waiting for the frame transmission right, the RETH station acquires this right and can therefore transmit frames.

Step S5:

Having acquired the right, the RETH station transmits data frames, as will be described below.

Step S5-1:

The station now having the right can transmit Ethernet frames, no matter whether or not carriers exist in the transmission path.

Step S5-2:

The station having the right may detect that the Ethernet frame it has transmitted collides with the frames transmitted from any other station of the data transmitting system or from any station connected to the transmission path and capable of transmitting Ethernet frames on the basis of the Ethernet standards. If this is the case, the station keeps transmitting an Ethernet preamble for a prescribed time. If the collision of frames continues despite the transmission of the Ethernet preamble, the station stops transmitting the Ethernet preamble. If the station further transmits the Ethernet preamble, the data transmitting system may be paralyzed.

Step S5-3:

The station having the right may detect that the Ethernet frame it has transmitted collides with the frames transmitted from any other station of the data transmitting system or from any station connected to the transmission path and capable of transmitting Ethernet frames on the basis of the Ethernet standards. In this case, the station keeps transmitting an Ethernet preamble for a prescribed time. If the collision of frames ceases, thanks to the transmission of the Ethernet preamble, the station continues to transmit Ethernet frames. That is, the station having the frame transmission right occupies the transmission path.

Step S6:

Upon transmitting all data frames it must transmit, the station having the frame transmission right transmits a transmission-completion signal frame, thus transferring the right to any other RETH station. In other words, as long as it has data frames to transmit, the station keeps on transmitting data frames.

Each RETH station incorporates a timer for setting the period during which it can transmit frames. If the station having the frame transmission right determines that it cannot transmit all Ethernet frames (data frames) to transmit, within the period set by the timer, it transmits an Ethernet frame having a transmission-completion signal recorded in the specific field mentioned above. Hence, each RETH station does not keep transmitting frames beyond the period set by the timer and would not use part or all of the period during which any other RETH station can transmit frames. As a result, the first half cycle T1 need not be lengthened, and the second half cycle T2 will not be shortened.

Step S7:

If the station having the frame transmission right transmits a transmission-completion signal frame or does not transmit this signal for a time longer than the period, the slot count value in each RETH station is incremented by one. The slot counter provided in the RETH station therefore stores the slot count value contained in the last transmission-completion signal frame, which has been incremented by one. Hence, when the operation returns from Step S9 to Step S4, the RETH station waiting for the frame transmission right can acquire the frame transmission right even if it has not received the transmission-completion signal frame, provided that the slot count value coincides with the slot number given to the RETH station.

Step S8:

Each RETH station determines whether the frame transmission right is sequentially transferred from one RETH station to the next and whether any other RETH station has a trouble, inevitably delaying the transmission of the transmission-completion signal frame.

That is, each RETH station holds the slot count value representing the timing of transmitting frames, which the data transmitting system has designated. If the RETH station has received an Ethernet frame containing a transmission-completion signal, it holds the address and slot count value of the source station, both contained in a transmission-completion signal frame. The RETH station examines these items of information, thereby determining whether or not the Ethernet frame has been normally transmitted in accordance with the slot count value assigned to the source station.

Step S9:

Each RETH station has a subscribed station counter and operates as will be described below, in order to detect the time when the first half cycle T1 ends and the second half cycle T2 starts and to operate in the same way as the Ethernet transmitting station in the second half cycle T2.

First, the RETH station receives a sync signal frame, which contains the number of the transmitting stations subscribed to the real-time Ethernet network. The subscribed station counter provided in the RETH station holds the number of the subscribed transmitting stations.

Every time the RETH station receives a transmission-completion signal frame, the count of the subscribed station counter is reduced by one. When the count of the subscribed station counter becomes zero, it is determined that the first half cycle T1 has terminated. The second half cycle T2 starts at this time, lasting until the RETH station receives the next sync signal frame. Hence, the RETH station does not transmit a data frame having a destination address which is a specific multi cast address, i.e., a transmission-completion signal frame, until it receives the next sync signal frame. Nor does it acquire the frame transmission right from any other RETH station. The second half cycle of the Ethernet cycle is thereby secured.

Step S10:

Step S10 is performed at the start of the second half cycle T2.

The first half cycle T1 starts when the synchronous transmitting station, i.e., one of the real-time transmitting stations, transmits a sync signal. The first half cycle T1 is allocated to the transmission of an Ethernet frame from the real-time Ethernet station. As has been explained in conjunction with Step S9, the second half cycle T2 starts after all real-time transmitting stations subscribed to the real-time Ethernet network have transmitted Ethernet frames, one after another. The second half cycle T2 is allocated to achieve subscription to the real-time Ethernet network and to enable any Ethernet transmitting station to transmit Ethernet frames. Hence, during this cycle, the real-time Ethernet stations function as Ethernet transmitting stations.

Step S11:

During the second half cycle T2, each RETH station can transmit Ethernet frames, as described above. During this cycle, any transmitting station that has such hardware and software as to function as a RETH station, that has yet not been subscribed to the real-time Ethernet network and that is operating as an Ethernet transmitting station can be subscribed to the real-time Ethernet network.

In other words, any of the transmitting stations that is to be subscribed to the to the real-time Ethernet network holds the number of subscribed stations, which is contained in the sync signal frame. The transmitting station then receives the transmission-complete signal frame transmitted from a station subscribed to the real-time Ethernet network. Nest, the transmitting station reduces the number of subscribed stations and determines that the second half cycle T2 starts (when the count of the subscribed station counter becomes zero).

During the second half cycle T2, any station not subscribed yet can be subscribed. Any station to be subscribed to the real-time Ethernet network transmits an Ethernet frame upon lapse of the time predetermined for the station. This Ethernet frame contains a subscription-requesting signal and an address designating the synchronous transmitting station as the destination. Upon detecting that the subscription-requesting signal frame does not collide with other frames in the transmission path, the station determines that it has been subscribed successfully.

Step S12:

The synchronous transmitting station receives the subscription-requesting signal frame and then accepts the request as will be described below.

When the synchronous transmitting station receives the subscription-requesting signal frame, it reads and holds the address designating the synchronous transmitting station. The synchronous transmitting station then adds one to the number of subscribed stations, thereby generating a new number of subscribed stations. Further, the synchronous transmitting station transmits an Ethernet frame to the RETH station having a source station address. This Ethernet frame contains a control identifier and a subscription-accepting signal. The control identifier is recorded in the specific field of the frame. The subscription-accepting signal indicates the acceptance of the subscription request and the timing of transmitting frames in the first half cycle T1. This Ethernet frame, which contains the subscription-accepting signal, contains the new number of subscribed stations in the specific field. The new number of subscribed stations will be used as the slot number designating the RETH station having the source station address. (The slot number is a value that shows that the RETH station has acquired the frame transmission right.)

Meanwhile, the station that has received the subscription-accepting signal frame (i.e., the station that has transmitted the subscription-requesting signal frame) reads and holds the slot number contained in the Ethernet frame it has received. Thereafter, this transmitting station acquires the frame transmission right when the count of the slot counter provided in it reaches the slot number value. The station operates to transfer the frame transmission right at a prescribed timing.

Step S13:

When the second half cycle T2 expires, the operation advances to Step S14. In some cases, the operation returns from Step S14 to Step S3. The synchronous transmitting station outputs a new sync signal frame. The transmission cycle T is thereby terminated, and the next transmission cycle T starts. The new sync signal frame may not be transmitted from the synchronous transmitting station outputs even after the transmission cycle T has expired (or even after the second half cycle T2 has terminated). If so, Step S14 is performed as will be described below.

Step S14:

Each RETH station may not receive a sync signal frame even after the predetermined time has passed, though the real-time Ethernet network is already in service. In this case, the operating state of the RETH station transits from the on-line state to the off-line state.

Thus, the RETH station regains the state it had when the data transmitting system was activated. The RETH station then starts operating to determine the synchronous transmitting station. More specifically, the operation returns to Step S1, in which it determines the synchronous transmitting station. The operation steps to Step S2 and then to Step S3, thereby setting the real-time Ethernet network back into service.

Thus far described is the operation performed in the network of the configuration shown in FIGS. 1A and 1B. The operation performed in the network of the configuration shown in FIG. 1C will be explained below. Operation in the Network Shown in FIG. 1C:

The operation performed in the network of the configuration shown in FIG. 1C is basically the same as the operation shown in FIGS. 8A and 8B. In the network of FIG. 1C, however, switching hubs are provided among the networks. Each switching hub incorporates a buffer. In some cases, the buffers provided in the switching hubs make it difficult for each station to acquire the frame transmission right.

That is, the transmission of frames from any Ethernet transmitting station cannot be inhibited by detecting the collision of frames. This is because, in principle, no frames collide among the Ethernet transmitting stations connected to switching hub devices or the like. As a consequence, frames may be transmitted from the Ethernet transmitting stations, at an unexpected timing and in unexpected numbers. If this happens, the frames collides with the frames transmitted from any real-time Ethernet station, in the switching hub devices. If any switching hub device is thereby over-loaded, the frames will be discarded whichever transmitting station has transmitted them, an Ethernet transmitting station or a real-time Ethernet station. Frames may be accumulated in the switching hub devices. This may render it impossible for each real-time Ethernet station to transmit frames within a prescribed time or to transmit frames reliably.

To prevent this, the network of FIG. 1C incorporates network interface apparatuses and data transmitting stations, which are designed as will be described below.

That is, each RETH station has at least one real-time Ethernet interface for connecting the station to a transmission path to which only RETH stations are connected, and at least one Ethernet interface for connecting the station to Ethernet transmitting stations. The real-time Ethernet interface and the Ethernet interface function as transmission path interfaces connected to them, respectively. More correctly, the real-time Ethernet interface performs the function of a RETH station, which is illustrated in FIGS. 7A and 7B. On the other hand, the Ethernet interface performs the function of an Ethernet transmitting station.

As shown in FIG. 1C, each RETH station is connected to a system (segment) to which only RETH stations can be connected, though by means of the switching hub devices or hub devices. Any transmission path interface for connecting RETH stations to the system is a real-time Ethernet interface. The RETH station is connected, in some cases, to a system composed of Ethernet transmitting stations only, as is illustrated in FIG. 1C. Any transmitting path interface for connecting RETH stations to this system is an Ethernet interface. In this case, any Ethernet transmitting station belonging to this system is connected to another transmitting station by the RETH station.

More specifically, the ETH stations are connected to the RETH stations, or the ETH stations are connected to one another, by a network composed of RETH stations only. No devices that effect frame buffering, such as switching hub devices, are arranged in the systems each comprising RETH stations and ETH stations. Therefore, this invention can provide a data transmitting system, which is of such a large scale as is shown in FIG. 1C. The RETH stations transmit frames only while they are holding the frame transmission right. Hence, switching hub devices, if provided, will cause no problems, provided that no ETH stations are provided in the system.

The data transmitting system shown in FIG. 1C will be described in greater detail.

In the first half cycle T1, each RETH station relays the Ethernet frame it has received from a real-time Ethernet interface, to an Ethernet interface. The RETH station may receive no Ethernet frames, and no carriers may exist in the transmission path to which only ETH stations are connected. If this is the case, the real-time Ethernet interface will occupy the transmission path to which the Ethernet interface is connected. More precisely, the real-time Ethernet interface transmits an Ethernet preamble signal at an appropriate time, and the Ethernet preamble signal is transmitted via the Ethernet interface to the transmission path to which only ETH stations are connected.

As a result, frames are transmitted from the RETH station to the ETH station through the real-time Ethernet interface and the Ethernet interface. If there are not frames to transmit, no frames can be transmitted to the system comprising ETH stations only since the Ethernet preamble signal has been transmitted to the transmission path to which only ETH stations are connected. Thus, the data transmitting system of FIG. 1C performs basically the same operation as the data transmitting system shown in FIGS. 1A and 1B.

In the second half cycle T2, the real-time Ethernet interface transmits no Ethernet preamble signals, and each RETH station operates as nothing more than a device for relaying Ethernet frames.

The RETH stations and ETH stations, which perform the functions described above, can constitute the following network system.

An Ethernet having a bus-type transmission path comprising repeaters of the Ethernet standards, and an Ethernet having a star-type transmission path comprising repeater hubs and switching hubs are combined. A data transmitting system is thereby provided, which comprises RETH stations and ETH stations with the above-mentioned design limitation.

[Operation of the Network Interface Apparatus]

It has been described how the network interface apparatus, data transmitting apparatus and data transmitting system according to the invention are constructed and how the apparatuses and system operate. The network interface apparatus of the invention will be described in more detail, with reference to a particular example. The example is of the type illustrated in FIG. 2A and can be used in all data transmitting systems shown in FIGS. 1A, 1B and 1C.

FIG. 9 and FIGS. 10A to 10E show the hardware configuration of this network interface apparatus. In the following description, the word "true" means a positive logic value "1."

The network interface apparatus shown in FIG. 9 and FIGS. 10A to 10E comprises two interfaces, i.e., a real-time Ethernet interface (also known as "real-time interface"), and an Ethernet interface.

In the real-time interface, the first receiving circuit (Rec1) 1 receives a signal Rec-In. The signal Rec-In corresponds to the signal Tx-out transmitted from the first transceiver circuit (Tcv1) 19 or from the second collision-signal generating circuit (Cols gen2) 40.

The signal Erec-In the second receiving circuit (Rec2) 37 has received corresponds to the signal Etx-out transmitted from the second transceiver circuit (Tcv2) 42 or the first collision-signal generating circuit (Cols gen1) 43 to the Ethernet interface. The receiving circuit 1 receives the signal Rec-In, and the frame-detecting circuit 2 (Rec-Srt-End) identifies the signal Rec-In. The frame-detecting circuit 2 outputs a reception start signal Rvsrt when it starts receiving a frame, and a reception end signal Rvend when it finishes receiving the frame. The reception signal Rec-In is supplied from the first receiving circuit 1 to the first decoder circuit (Dec1) 3. The first decoder circuit 3 converts the signal Rec-In to a digital signal train.

The output of the decoder circuit 3 is input to a specific multi cast address determining circuit (BC-Det) 4. The circuit 4 determines whether the destination address of the frame the receiving circuit 1 has received is one that is defined as "specific multi cast address" in the present invention, when it receives a signal BC-set for setting a specific multi cast address. The multi cast address-setting signal BC-set has been transmitted from the output register circuit 6 (Out-Reg), which will be described later. If the destination address coincides with any one of the addresses contained in the specific multi cast address, the signal BC-coin (specific multi cast address coincidence signal) will become true.

The specific multi cast address coincidence signal BC-coin is input to the output register circuit 6 through the microprocessor bus (MP) 53 of the micro-controller circuit 5 (CPU circuit). The micro-controller circuit 5 writes the signal BC-coin, whereby the multi cast address-setting signal BC-set is supplied to the specific multi cast address determining circuit 4.

The error determining circuit (CRC-Rev) 7 determines whether any frame it has received during the period defined by the reception start signal Rvsrt and the reception end signal Rvend, both supplied from the frame-detecting circuit 2 contains an error nor not. If the circuit 7 determines that the frame contains no error, a normal reception-completion signal Gd-CRC for the frame becomes true. If the frame contains a cyclic redundancy check code CRC generated by the error signal generating circuit provided in the frame transmission control circuit (Tx-Frame-Cnt) 13, which will be described later, an abnormal reception-completion signal Bd-CRC for the frame becomes true.

The command-detecting circuit (CMD-Det) 8 checks the specific field of the frame it has received if the destination address coincides with the specific multi cast address, and determines whether or not the frame contains a sync signal SYN and a transmission-completion signal CMP. The result of the decision is that both the sync signal SYN and the transmission-completion signal CMP become true.

The sync-signal congestion detecting timer (SYN-Stall-Timer) 9 comprises a down counter. The count of the down counter is reset to a sync-signal absence detecting time value SYN-Stall-set, each time a normal reception signal Gd-SYN is input to the down counter from the reception state control circuit Rec-State-Cnt) 10, which will be described later. The sync-signal absence detecting time value SYN-Stall-set is written by the micro-controller circuit 5 into the output register circuit 6. The value SYN-Stall-set is then supplied to the sync-signal congestion detecting timer 9.

The reception state control circuit (Rec-StateCnt) 10 (shown in FIG. 10B) generates the normal reception signal Gd-SYN if the sync signal SYN, the normal reception-completion signal Gd-CRC, and the reception end signal Rvend are all true.

In other words, the normal reception signal Gd-SYN is generated every time a sync signal frame is normally generated. If no normal reception signals Gd-SYN are received after the time has elapsed which is defined by the sync-signal absence detecting time value SYN-Stall-set, the count of the sync-signal congestion detecting timer 9 reaches zero. In this case, the timer 9 generates a sync-signal absence detection signal YNC-Stall-Det, which indicates that no sync signals SYN have ceased to come.

The sync-signal absence detection signal YNC-Stall-Det is supplied to the node delay timer (Node-Delay-Timer) 11 shown in FIG. 10A. The sync-signal absence detection signal YNC-Stall-Det may remain true even after the time defined by a node-delay time Node-Delay-set has expired. If so, the node delay timer 11 generates a sync-signal absence signal SYN-Stall that indicates that the synchronization function of the data transmitting system fails to work. The node-delay time Node-Delay-set is set by writing the delay time into the output register circuit 6.

The overall operation of the network interface apparatus has been explained. The sequence of the operation will now be described, with reference to the steps shown in FIGS. 8A and 8B.

Step S1 (Determination of the Synchronous Station at System Activation)

First, one of the stations of the data transmitting system is designated as synchronous station that cyclically transmits the timing of using an implicit token path. The station must be so designated in order to realize an implicit taken path (different from the one described in BACKGROUND OF THE INVENTION). If any synchronous transmitting station has not been determined when the data transmitting system is activated, one of the stations provided in the system is designated as synchronous transmitting station.

In this case, any sync signal frame may not be detected within a predetermined time that corresponds to one-cycle time. If this is the case, the synchronous transmitting section uses the destination address as the specific multi cast address, thereby transmitting a sync signal frame. If the sync signal frame does not collide with any other frame in the transmission path, the transmitting station that has transmitted the Ethernet frame is designated as the synchronous transmitting station, which will cyclically transmit sync signal frames.

The means that accomplish this comprises the receiving circuit 1, the frame-detecting circuit 2, the micro-controller circuit 5, the sync-signal congestion detecting timer 9, the reception state control circuit (Rec-State-Cnt) 10, the node delay timer 11, the frame transmission control circuit (Tx-Frame-Cnt) 13, a common memory circuit (CM) 14, a first collision detecting circuit (Cols-Det1) 15, a preamble transmission control circuit (PRE-Tx-Cnt) 16, a transmission state control circuit (Tx-State-Cnt) 17, a first encoder circuit (Enc1) 18, and the first transceiver circuit (Tcv1) 19.

When the data transmitting system is activated, the command-detecting circuit (CMD-Det) 8 and the state control circuit (Rec-State-Cnt) 10 determine whether a frame containing a sync signal SYN has been cyclically transmitted through the transmission path, in accordance with whether or not a sync signal frame has been normally generated and a normal reception signal Gd-SYN has thereby be generated. If normal reception signals Gd-SYN have been cyclically generated, it is determined that the data transmitting system has already been activated and that the synchronous transmitting station is functioning.

If the synchronous transmitting station is functioning, this transmitting station is incorporated into the data transmitting system by effecting the procedure of subscribing new transmitting stations, which will be explained later. If the state control circuit 10 has generated no normal reception signals Gd-SYN and if the node delay timer 11 has output a true sync-signal absence signal SYS-Stall, the transmission state control circuit (Tx-State-Cnt) 17 will operated as will be described below.

If the transmission state control circuit 17 generates a sync-signal transmission instructing signal Tx-SYS if the sync-signal absence signal SYS-Stall, sync node signal SYN-Node and on-line state signal On-line are true, false and false, respectively. The sync node signal SYN-Node indicates that the transmitting station is the synchronous transmitting station. The on-line state signal On-line indicates that the data transmitting system is in on-line state. The sync-signal transmission instructing signal Tx-SYS instructs that the frame transmission control circuit (Tx-Frame-Cnt) should transmit an Ethernet frame whose destination address is a specific multi cast address and which contains a sync signal recorded in its specific field.

The frame transmission control circuit 13 reads the sync frame data already stored in the common memory circuit 14 and starts transmitting the sync frame data. The frame transmission control circuit 13 outputs a sync frame transmission signal Txing-SYN, which shows that the sync frame is being transmitted.

The data is supplied to the first encoder circuit 18 via the preamble transmission control circuit 16. The control circuit 16 controls the collision of frames being transmitted through the transmission path. The first encoder circuit 18 encodes the data and supplies the same to the transmission path. The frame transmission control circuit 13 outputs a transmission-completion signal Tx-end (i.e., the timing signal indicating that the frame has been transmitted). The transmission-completion signal Tx-end is supplied via an interrupt input circuit 20 to the micro-controller circuit 5, as interrupt input thereto.

In response to the reception signal Rec-In, the receiving circuit 1 receives a frame, which is to be transmitted. The first collision detecting circuit 15 outputs a carrier detection signal Crs and a collision occurrence signal Cols. The signal Crs indicates that carriers have been detected in the transmission path. The signal Cols shows that frames are colliding in the transmission path. The collision occurrence signal Cols is supplied to the state control circuit 10. In the state control circuit 10, the sync frame transmission signal Txing-SYN, collision occurrence signal Cols, normal reception-completion signal Gd-CRC, sync signal SYN, sync-signal absence detection signal SYN-Stall-Det, reception end signal Rvend may be true, false, true, true, true and true, respectively, and the sync frame may therefore be transmitted without colliding with any other frame. If so, the sync node signal SYN-Node, which indicates that the transmitting station is the synchronous transmitting station, becomes true. As a result, not only the station that has transmitted the sync frame becomes the synchronous transmitting station, but also the on-line state signal On-line, which indicates that the data transmitting system is in on-line state, becomes true. If the collision occurrence signal Cols is true, the frames are colliding in the transmission path, and the sync node signal SYN-Node becomes false. The sync node signal SYN-Node is supplied to an input register circuit (IN-Reg) 21 in response to the transmission-completion signal Tx-end. The micro-controller circuit checks the sync node signal SYN-Node, by using the program stored in it, thereby determining whether the transmitting station is the synchronous transmitting station or not.

The input register circuit 21 reads the syncsignal absence detection signal SYN-Stall-Det, whereby it is determined that the data transmitting system is stalled, that is, the synchronous transmitting station does not function. Each transmitting station continues the above-described operation until the synchronous transmitting station is activated.

Step S2 (Prevention of Conflict Between Synchronous Stations)

This step is performed outside the synchronous transmitting station in one of the following alternative cases. First, a synchronous transmitting station exists in the data transmitting system and can control transmission in real-time fashion. Second, when a synchronous transmitting station is designated in Step S1, another station has almost become a synchronous transmitting station.

That is, to prevent two or more stations from becoming synchronous transmitting stations, any station that has received a sync signal frame from the synchronous transmitting station and that can therefore be identified transits to an on-line state which indicates that the data transmitting system has put into service. This inhibits the transmission of a frame which contains a sync signal and which is prepared to be transmitted is thereby inhibited, and resets the station already prepared to become a synchronous transmitting station.

More specifically, any station that has received a sync frame operates the following operation not to conflict with the synchronous transmitting station while the data transmitting system remains activated. The state control circuit 10 receives a sync frame transmission signal Txing-SYN from the frame transmission control circuit 13, a sync signal from the command-detecting circuit 8, a normal reception-completion signal Gd-CRC from a true/false determining circuit 7, a sync-signal absence detection signal SYN-Stall-Det internally delayed, and a reception end signal Rvend from the frame-detecting circuit 2. If the sync frame transmission signal Txing-SYN, sync signal SYN, normal reception-completion signal Gd-CRC, sync-signal absence detection signal SYN-Stall-Det and end signal Rvend are false, true, true, true and true, respectively, the on-line state signal On-line output from the state control circuit 10 will be true. The normal reception signal Gd-SYN output from the state control circuit 10 resets the sync-signal absence signal SYN-Stall output from the delay timer 11, thereby rendering the sync-signal transmission instructing signal Tx-SYS false. This prevents any transmitting station that may generate a sync frame immediately after the synchronous transmitting station has generated a sync frame, from generating a sync frame.

Step S3 (Transmission of a Sync Frame)

The synchronous transmitting station transmits a sync signal frame at predetermined time intervals. This sync signal frame has a specific multi cast address, which is used as the destination address. The sync signal frame contains at least a sync signal, a logic transmitting station number, and a number of subscribed stations. In each of the station of the data transmitting system, the logic transmitting station number identifies the synchronous transmitting stations, and the number of subscribed stations indicates the total number of the stations subscribed to the data transmitting system.

More precisely, in the synchronous transmitting station, the preset time SYN-Time-set of transmitting the sync signal, which corresponds to the time of transmitting the sync signal SYN and which is cyclically output from the command-detecting circuit 8, is written into the output register circuit 6. The preset time SYN-Time-set of transmitting the sync signal is thereby set in the sync timer circuit (SYN-Timer) 22 shown in FIG. 10C. The sync timer circuit 22 cyclically generates a transmission request signal SYN- Tx-Time that requests for the transmission of the sync signal. The transmitting request signal SYN-Tx-Time is supplied to the transmission state control circuit 17. The transmission state control circuit 17 generates a sync-signal transmission instructing signal Tx-SYS if the sync node signal SYN-Node and on-line state signal On-line, both output from the state control circuit 10, are true. In response to the sync-signal transmission instructing signal Tx-SYS, the synchronous transmitting station cyclically transmits a sync frame to the transmission path.

If the synchronous transmitting station has no data to transmit, it outputs an Ethernet frame having a transmission-completion signal that serves as a sync signal as well, in order to prevent a decrease in the data-transmitting efficiency of the transmission path. The Ethernet frame serves as a sync signal and a transmission-completion signal in any transmitting station that has received it.

If the synchronous transmitting station transmits only one frame, the transmission-completion signal CMP can be supplied, together with the sync signal SYN, to any station that receives the frame. In the network interface apparatus shown in FIG. 9 and FIGS. 10A to 10E, the command-detecting circuit 8 generates the sync signal SYN and transmission-completion signal CMP at the same time, upon receipt of a sync/transmission-completion signal SYNCMP. The sync signal SYN and the transmission-completion signal CMP, thus generated, perform various functions.

Step S4 (Acquisition of Transmission Timing)

In this step, the transmitting stations subscribed to the data transmitting system acquire, in turn, the timing of cyclically transmitting frames. Each transmitting station outputs a transmission-completion signal upon transmitting an Ethernet frame, indicating that it has no frames to transmit after the Ethernet frame.

In any transmitting station that waits for the frame transmission right, the slot counter circuit (Slot-counter) 23 is reset when the transmitting station receives the sync signal transmitted from the synchronous transmitting station. This transmitting station may receive a normal reception-completion signal from the transmitting station that has the frame transmission right, which indicates that an Ethernet frame containing a sync signal has been normally received. When the transmitting station waiting for the frame transmission right receives the normal reception-completion signal, the slot count value contained in the Ethernet frame is set to the slot counter incorporated in the transmitting station and is then increased by one, generating a new slot count value. If the new slot count value coincides with the slot number value given to the transmitting station that waits for the frame transmission right, this transmitting station acquires the frame transmission right and will operate as the next station that can transmit frames.

To be more specific, when a transmitting station receives a frame containing a transmission-completion signal CMP, the command-detecting circuit 8 provided in the transmitting station receives the transmission-completion signal CMP and render the same true. The transmission-completion detecting circuit (Rcv-Slot) 24 incorporated in the transmitting station holds the slot count value of the transmitting station that has transmitted the frame containing the signal CMP, which is recorded in the specific field.

At the time the transmission-completion signal CMP, normal reception-completion signal Gd-CRC and reception end signal Rvend are all true, the state control circuit 10 generates a reception-completion signal CMP-end. The signal CMP-end indicates, that the transmitting station has received the transmission-completion signal CMP. Further, the slot count value of the station that has transmitted the frame containing the signal CMP, which is held in the transmission-completion detecting circuit (Rcv-Slot) 24, is set in the slot counter circuit (Slot-counter) 23. Then, the adder circuit (Add+1) 25 adds one to the count of the slot counter circuit 23.

The count value in the slot counter circuit 23 is compared with the slot number value given to the transmitting station, by means of a coincidence detecting circuit (Coin-Det) 26. If the coincidence detecting circuit 26 detects that the count value coincides with the slot number value, the coincidence detection signal Tx-Coin output from the circuit 26 is true. The coincidence detection signal Tx-Coin is supplied to the state control circuit 10. The state control circuit 10 outputs a transmission-permitting signal Tx-next when the reception end signal Rvend is true.

When the transmission-permitting signal Tx-next becomes true, the transmitting station can transmit frames through the transmission path. Upon receipt of the transmission-permitting signal Tx-next, the transmission state control circuit 17 generates a data-frame transmission instructing signal Tx-Data, which is supplied to the frame transmission control circuit 13. Upon receipt of the data-frame transmission instructing signal Tx-Data, the frame transmission control circuit 13 reads the frames stored in the common memory circuit 14 and starts transmitting the frames.

The frames are transmitted to the transmission path via the preamble transmission control circuit 16 and the first encoder circuit 18, in the same way as the sync frames is transmitted. The count value in the slot counter circuit 23 is reset every time transmitting station receives a sync signal. Every time the coincidence detecting circuit 26 receives a transmission-completion signal, a new value is set and compared with the slot value Slot-No of the transmitting station.

The slot number value Slt-No was assigned to the transmitting station in the process of subscribing the station to the data transmitting system. (The process will be described later.) The slot number value Slt-No has been written into the output register circuit 6 in accordance with the program of the micro-controller circuit 5.

Step S5:

Step S5-1 (Outputting of Frames):

A data transmitting system may comprise a plurality of data transmitting apparatuses, each capable of transmitting and receiving Ethernet frames in accordance with the Ethernet standards, and transmitting stations of a real-time Ethernet network. In such a data transmitting system, the stations can acquire the frame transmission right one after another, each after receiving a sync signal transmitting from the synchronous transmitting station. The station that has acquired the frame transmission right starts transmitting an Ethernet frame having a specific multi cast address used as the destination address, no matter whether carriers exist or not in the transmission path. Hence, the station can finish transmitting data frames within a desired period of time, even if any Ethernet transmitting station connected to the transmission path is transmitting frames.

That is, signals can be transmitted even if other signals exist in the transmission path, which has not assumed an operative state in view of the Ethernet standards. For this reason, the preamble signal, which is the leading part of the Ethernet frame, and the frame data thereof, which is to be output after the preamble signal, are controlled by a frame-transmission stop signal Tx-stp and a frame-transmission restart signal Tx-re-srt, respectively. The preamble signal is output from the preamble transmission control circuit 16 under the control of the frame-transmission stop signal Tx-stp. The frame data is output from the frame transmission control circuit 13 under the control of the frame-transmission restart signal Tx-re-srt.

Step S5-2 (Preventing the Collision of Frames):

The station that has the frame transmission right keeps transmitting an Ethernet preamble for a predetermined time if it is detected that the frames transmitted from the other stations of the data transmitting system and the frames transmitted from the stations connected to the transmission path and capable of transmitting Ethernet frames collide in the transmission path. If the collision of frames continues even after the predetermined time has elapsed, the station stops transmitting the Ethernet frame.

To be more specific, a frame-transmission instructing signal Tx-On is supplied to the preamble transmission control circuit 16 when the output from the transmission state control circuit 17 indicates that a frame has been transmitting to the frame transmission control circuit 13. Upon receipt of the frame-transmission instructing signal Tx-On, the preamble transmission control circuit 16 generates a preamble signal, which is output to the first encoder circuit 18. If the frames collide in the transmission path, the collision occurrence signal Cols output from the first collision detecting circuit 15 becomes true.

The collision occurrence signal Cols may not become false even after the station having the frame transmission right has kept transmitting an Ethernet preamble for a predetermined time. If so, the preamble transmission control circuit 16 outputs a frame-transmission stop signal Tx-stp. The frame-transmission stop signal TX-stp is supplied to the frame transmission control circuit 13. In response to the signal Tx-stp, the circuit 13 stops transmitting the frame.

Then, the frame-transmission instructing signal Tx-On output from the frame transmission control circuit 13 becomes false, whereby the preamble transmission control circuit 16 stops generating the preamble signal. The frame-transmission stop signal Tx-stp output from the preamble transmission control circuit 16 is supplied also to the microcontroller circuit 5, as an interrupt input thereto. Upon receipt of the signal Tx-stp, the circuit 5 determines that the transmission of frame has been stopped, in accordance with the program of the circuit 5.

Step 55-3 (Acquiring Transmission Timing From Ethernet Node):

In the Ethernet transmitting station which accords with the Ethernet standards, the transmission of Ethernet frames is inhibited in the same conditions as in Step S5-2, within a prescribed time from the occurrence of the frame collision. Therefore, in the data transmitting system comprising Ethernet transmitting stations, along with stations of the other type, the ETH station having the frame transmission right keeps transmitting an Ethernet preamble for a predetermined time if it detects collision of frames at the time of transmitting an Ethernet frame. When the collision of frames ceases, the ETH station transmits the Ethernet frame.

More precisely, the preamble transmission control circuit 16 generates a preamble signal in response to the frame-transmission instructing signal Tx-On output from the frame transmission control circuit 13. When frames collide in the transmission path, the collision occurrence signal Cols output from the first collision detecting circuit 15 becomes true. The collision occurrence signal Cols may become false after the preamble signal has been transmitted for a predetermined time, i.e., a time much shorter than the minimum back-off time. In this case, the preamble transmission control circuit 16 temporarily stops generating the preamble signal.

Upon lapse of a time a little shorter than the inter-frame time of the Ethernet standards, the transmission of the preamble signal is started again. The preamble transmission control circuit 16 first generates an 8-byte preamble signal and then supplies a frame-transmission restart signal Tx-re-srt to the frame transmission control circuit 13. Upon receipt of the frame-transmission restart signal Tx-re-srt, the frame transmission control circuit 13 outputs the frame data which has been read from the common memory circuit 14. The frame data is supplied to the preamble transmission control circuit 16. At the same time, the circuit 13 outputs a frame-transmission start signal Tx-srt, thereby informing the control circuit 16 of the time the transmission of frame data has been started.

The preamble transmission control circuit 16 transmits the frame data to the first encoder circuit 18 at an appropriate timing, after transmitting the preamble to the circuit 18. After the transmission of the frame data, the frame transmission control circuit 13 outputs a cyclic redundancy check code CRC, which has been generated by the error signal generating circuit provided in the control circuit 13. Upon outputting the cyclic redundancy check code CRC, the control circuit 13 outputs a transmission-completion signal Tx-end that indicates that the transmission of the frame has completed. If the data transmitting system has data to transmit, the operation described above will be repeated.

Figure 11:
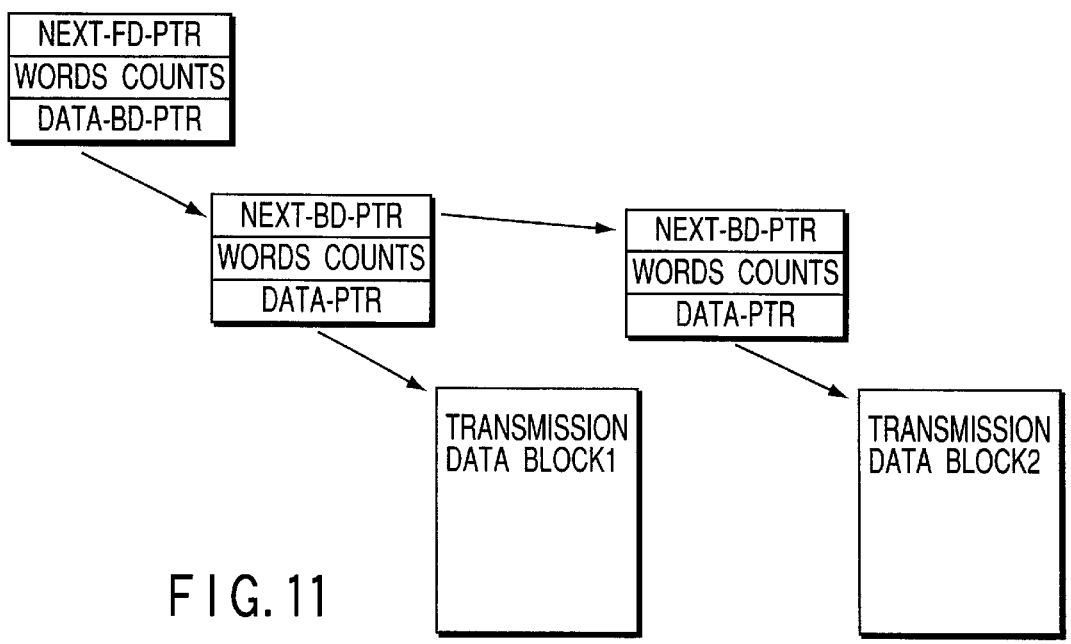
FIG. 11 is a diagram showing the configuration of a data buffer control word for each frame.

The frames continuously transmitted are controlled by frame descriptors (FD), each read for one frame from the common memory circuit 14, and some buffer descriptors (BD) designated by the FDs and coupled to one another. Each FD contains a Word-count indicating the number of data items constituting the data frame. Each BD also contains the Word-count showing the number of data items. When a plurality of frames are continuously transmitted, the same number of FDs are coupled to one another. FIG. 11 shows the configuration of a data buffer control work for one frame.

Step S6 (Allocating Band to Real-time Station and Managing the Band):

The first half cycle T1 is allocated to the real-time transmitting station. To maintain this half cycle constant, the real-time transmitting station incorporates a transmission time managing timer (Tx-Timer) 33. The count of the timer 33 represents the remaining part of the first half cycle T1. If it is determined that an Ethernet frame cannot be transmitted within the remaining part of the first half cycle T1, a transmission-completion signal frame is transmitted in place of the Ethernet frame.

That is, the transmission time managing timer (Tx-Timer) 33 is a down counter circuit. Set in this timer 33 is the transmission cycle value SYN-Time-set which has been output from the output register circuit 6 and which represents the cycle of transmitting the sync signal from the synchronous station. The count of the timer 33, which represents the remaining part of the first half cycle T1, is set into a remaining-time managing timer 34 when the transmission-permitting signal Tx-next output from the output register circuit 6 is active. The transmission time managing timer 33 is reset, and the transmission cycle value SYN-Time-set is newly set in the transmission time managing timer 33. The timer 33 therefore starts down-counting. The count of the remaining-time managing timer 34 is decreased by a subtracter circuit (Dcrt) 35 in units of, for example, bytes, as a transmission timing signal TX-Byte is supplied from frame transmission control circuit 13.

At the time of transmitting the new Ethernet frame, the frame transmission control circuit 13 supplies the Word-count of the frame descriptor FD, used as a transmission count signal TX-count, to a comparator circuit (Cpr-chk) 36. The comparator circuit 36 compares the transmission count signal TX-count with the count of the remaining-time managing timer 34. If the count of the remaining-time managing timer 34 is less than a preset value, it is determined that the Ethernet frame cannot be transmitted within the remaining time represented by the count of the transmission time managing timer 33. In this case, the output Tx-CMP of the comparator circuit 36 becomes active. The output Tx-CMP is supplied to the frame transmission control circuit 13, which transmits a transmitting-completion frame in place of the Ethernet frame.

Step S7 (Monitoring Completion of Transmission, and Eliminating Abnormal Condition):

The transmitting station that has acquired the frame transmission right transmits the last Ethernet frame having a specific multi cast address and containing a transmission-completion signal CMP.

Even if this transmitting station transmits no transmission-completion signal CMP, the implicit token must be continuously achieved without trouble. To this end, each transmitting station increases the slot count value by one if the station with the frame transmission right cannot transmit a transmission-completion signal frame to the transmission path within the prescribed time. Thus, the transmitting station having the slot number value that coincides with the slot count value acquires the frame transmission right.

For this purpose, each transmitting station incorporates a monitoring timer (CMP-Timer) 27 for monitoring the transmission-completion signal. The monitoring timer 27, which is shown in FIG. 10D, serves the purpose in the case where the transmitting station having the frame transmission right fails to transmit a data frame that contains the transmission-completion signal.

The monitoring timer 27 is set by the reception-completion signal CMP-end and the normal reception signal Gd-SYN, both output from the state control circuit 10. The signal CMP-end indicates that the transmission-completion signal has been normally received, and the signal Gd-SYN shows that the sync signal frame has been normally received. The reception-completion signal CMP-end may not be true even after the expiration of the transmission-completion signal time CMP-Time-set that has been preset by the output register circuit 6. If this is the case, the monitoring timer 27 counts up, rendering a transmission-completion signal absence signal CMP-lost true. The transmission-completion signal absence signal CMP-lost is supplied to the adder circuit (Add+1) 25 provided in the slot counter circuit 23. The adder circuit 25 adds one to the count of the slot counter circuit 23. Now that the count of the slot counter circuit 23 is incremented, the frame transmission right can be given to any other transmitting station.

Step S8 (Monitoring the Functions of the Transmitting Station):

It is necessary to determine whether or not the stations subscribed to the data transmitting system transmit Ethernet frames, one station after another, and whether or not each station has detected a delay of a transmission-completion signal, which has resulted from a trouble in the station. To this end, each station receives the Ethernet frame containing the transmission-completion signal, holds the destination address and the slot count value, both contained in the Ethernet frame, and verifies them at each cycle of the sync signal. Thus, it is determined whether the station given the frame transmission right is normally transmitting Ethernet frames.

That is, if the station having the frame transmission right transmits no data frames each containing a transmission-completion signal CMP, the frame transmission right shifts to the station that has the next slot number.

Figure 9:
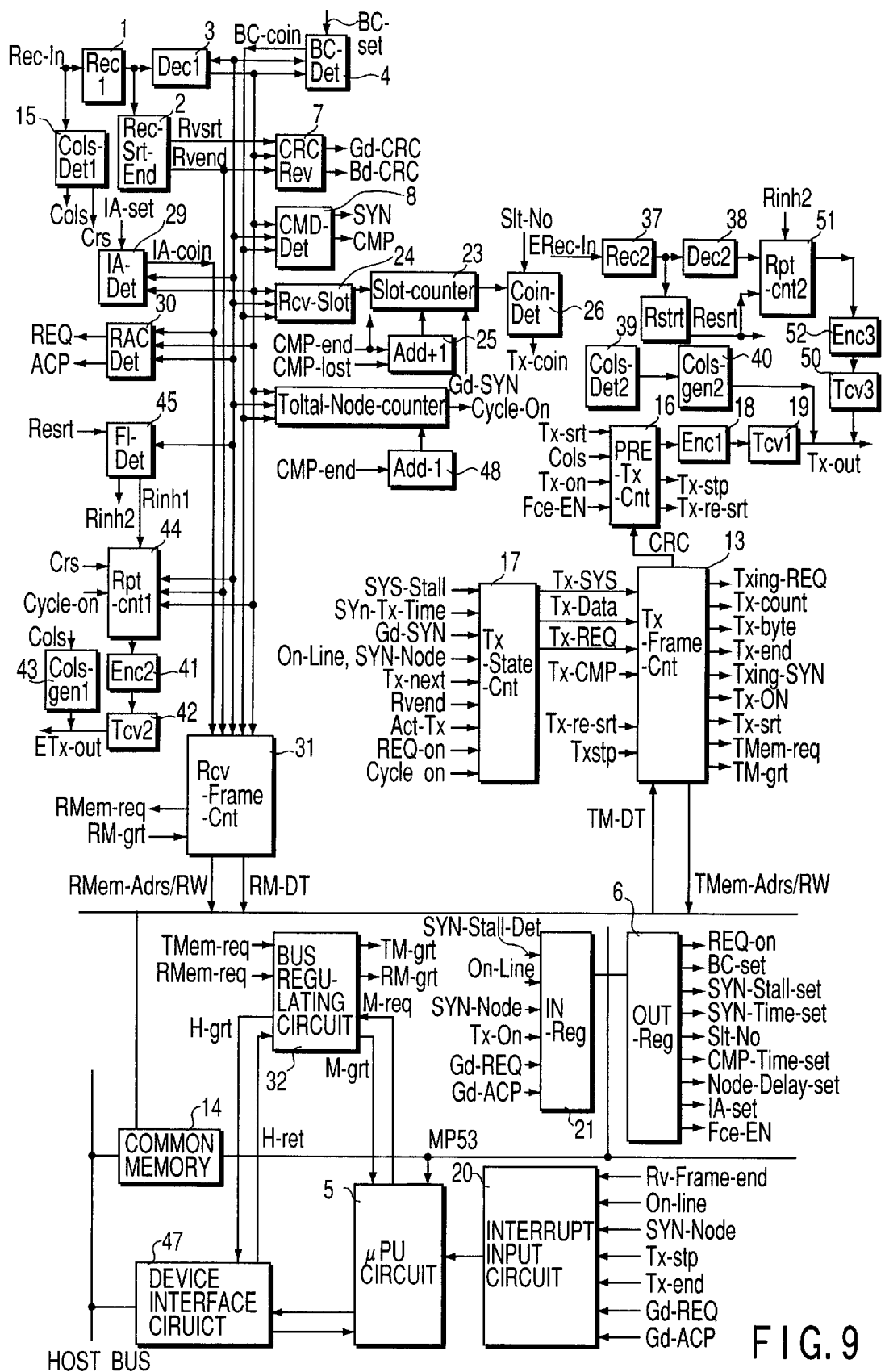
FIG. 9 is a block diagram illustrating, in detail, the network interface apparatus according to the invention.

Each frame received is stored into the common memory circuit 14 shown in FIG. 9. The micro-controller circuit 5 reads the address and slot count value of the source station, both contained in the frame stored in the common memory circuit 14. The address and slot count value are held in the common memory circuit 14. The micro-controller circuit 5 checks the slot count value contained in each frame and determines, from the slot count value, whether or not the address of the source station is the same as it was when examined last time.

Step S9 (Setting the Period of Transmitting Data Frames):

It is necessary to determine whether or not all stations subscribed to the data transmitting system have transmitted frames. To this end, any station that has received an Ethernet frame containing the sync signal transmitted from the synchronous transmitting station holds the number of subscribed stations in a subscribed node counter. Every time an Ethernet frame containing the transmission-completion signal transmitted from each station is normally received, the count of the subscribed node counter is decreased by one. When the count of this counter decreases to zero, it is determined that the first half cycle expires. Until the next sync signal arrives, it is assumed that none of the stations subscribed to the data transmitting system transmits an Ethernet frame that contains a destination address which is a specific multi cast address. This period is dedicated to, for example, the data transmission from general Ethernet transmitting stations.

More precisely, the subscribed node counter circuit (Total-Node-counter) 28 holds the number of the nodes subscribed to the data transmitting system, which is contained in the sync frame transmitted from the synchronous transmitting station. The count of the subscribed node counter circuit 28 is decreased by one by a subtracter circuit (Add−1) 48 when the subtracter circuit 48 receives a reception-completion signal CMP-end. When all stations subscribed to the system finish transmitting frames, the count of the subscribed node counter circuit 28 becomes zero. At this time, a subscription-accepting period signal Cycle-On becomes true. Now that the signal Cycle-on is true, the transmission state control circuit 17 inhibits the transmission of any frame that has a specific multi cast address.

Steps S10 and S13 (Division of Cycle in Hybrid Transmission System)

To divide the transmission cycle, Step S5 (particularly, sub-steps S5-1 and S5-3) is performed. The first half (i.e., first half cycle) of the transmission cycle, which is initiated by a sync signal transmitted from the synchronous transmitting station, is thereby allocated to the transmission of Ethernet frames from the real-time transmitting stations. The second half (i.e., the second half cycle) of the transmitting cycle, which starts after all real-time transmitting stations subscribed to the data transmitting system, is dedicated to the subscription of stations to the data transmitting system and the transmission of Ethernet frames from the Ethernet transmitting stations.

Step S11 (Requesting Subscription of New Station to the Data Transmitting System):

To be subscribed to the real-time Ethernet network operating, a new transmitting-station receives the sync signal that has been transmitted from the synchronous transmitting station, holds the number of subscribed stations, which is contained in an Ethernet frame, and receives the transmission-completion signal transmitted from the station that has transmitted the Ethernet frame. After the time prescribed for the transmitting station elapses after the count of the subscribed node counter has become zero, the transmitting station transmits an Ethernet frame. This Ethernet frame contains, as destination address, the address of the synchronous transmitting station and which also contains a signal requesting for the subscription to the data transmitting system. If it is determined that the Ethernet frame does not collide with other frames in the Ethernet transmission path, it is assumed that the transmitting station has been subscribed as requested.

That is, the period during which the subscription-accepting period signal Cycle -On output from the subscribed node counter circuit 28 remains true is dedicated to the subscription of new transmitting station and the acceptance of subscription requests. If the synchronous transmitting station has already been set in operating state, the frame data, which contains a subscription request signal and which also contains, as destination address, the address of the synchronous transmitting station, is stored in the common memory circuit 14.

Thereafter, a transmission request signal REQ-on is written into the output register circuit 6, thereby requesting that a subscription signal be transmitted. The transmission request signal REQ-on is supplied to the transmission state control circuit 17. If the subscription-accepting period signal Cycle-On is true, the output Tx-CMP of the comparator circuit 36, which requests for the transmission of a subscription request frame, will be active. The output Tx-CMP is input to the frame transmission control circuit 13. The control circuit 13 reads subscription request frame data from the common memory circuit 14 and transmits the same.

The frame transmission control circuit 13 outputs a signal Txing-REQ, which shows that a request frame is being transmitted. This signal Txing-REQ is supplied to the state control circuit 10. The signal Txing-REQ renders a normal reception signal Gd-REQ active when the normal reception-completion signal Gd-CRC, collision occurrence signal Cols and reception end signal Rvend are true, false and true, respectively. The normal reception signal Gd-REQ is supplied to the micro-controller circuit 5. The normal reception-completion signal Gd-CRC supplied to the input register circuit 21 is verified, thereby determining that the subscription request frame has been successfully transmitted from the transmitting station.

Step S12 (Accepting Subscription of Station, and Notifying Slot Number):

When the synchronous transmitting station receives an Ethernet frame which has been transmitted from the station requesting for subscription and which contains a subscription request signal, it increases the total number of subscribed stations by one, thus generating a new number of subscribed nodes.

The synchronous transmitting station uses the source node address read from the Ethernet frame it has received, thereby outputting a subscription-accepting signal frame to the station that has transmitted the subscription request. The subscription-accepting signal frame contains, in its specific field, a subscription-request-accepting signal and a subscription-accepting signal. The subscription-request-accepting signal serves as a specific control identifier. The subscription-accepting signal notifies a slot number value that will define the timing of transmitting frames to the station that has requested for subscription. The subscription-accepting signal frame further contains, in its specific field, the new number of subscribed nodes as notified slot number value. When the subscription-accepting signal frame is transmitted, there are notified the subscription of the new transmitting station to the data transmitting system and the slot number value of the new transmitting station.

In the station that has received the subscription-accepting signal, the slot number value contained in the Ethernet frame received is read and held in the slot number register. Hence, the station can transmit frames in the first half of the next transmission cycle.

More specifically, the synchronous transmitting station receives a frame containing a subscription request signal from the station that is requesting for subscription, while the subscription-accepting period signal Cycle-On remains true. When the address detecting circuit (IA-Det) 29 detects a frame that coincides with the individual address (ID address) signal IA-set of the station, it renders the ID address coincidence signal IA-coin true. The frame detecting circuit (reception confirming circuit RAC-Det) 30 determines whether the frame coinciding with the ID address is one that is requesting for subscription or one that has been subscribed. If the frame is one requesting or subscription, the circuit 30 outputs a subscription-requesting signal REQ. If the frame is one already subscribed, the circuit 30 outputs a subscription-accepting signal ACP. These signals are supplied to the state control circuit 10. If the reception end signal Rvend and normal reception-completion signal Gd-CRC are true, the normal reception signal Gd-REQ for the subscription-requesting frame and the normal reception signal Gd-ACP for the subscription-accepted frame will be true.

The ID address coincidence signal IA-coin, the output of the decoder circuit 3, the reception start signal Rvsrt, the reception end signal Rvend, and the specific multi cast address coincidence signal BC-coin are supplied to the frame reception control circuit (Rcv-Frame-Cnt) 31. The frame reception control circuit 31 receives an ID address containing a received address and frame data having a designated specific multi cast address and performs serial-parallel conversion on them. In response to a signal Rmem-req granting an access to a receiving memory, the frame reception control circuit 31 outputs a request for an access to the common memory circuit 14, to the bus-regulating circuit 32 that is connected to the micro-controller circuit 5 and a device interface circuit 47. Upon receipt of an access-granting signal RM-grt, the frame reception control circuit 31 writes the frame data RM-DT being received, into the common memory circuit 14 by using a memory-writing control/memory address signal Rmem-Adrs/RW.

The frame data received is written into the reception buffer area designated by the data buffer descriptor BD that is linked to the frame descriptor FD provided for the received data, in the same way as the data to be transmitted is read as described above. The length of the data thus written is written into the Word-count, and the number of all data items written is written into the Word-count area of the frame descriptor FD.

At the timing of an interrupt by the frame reception-completion signal Rv-Rrame-end output from the state control circuit 10, the program of the micro-controller circuit 5 reads the normal reception signal Gd-REQ from the input register circuit 21. After determining that the subscription-requesting frame has been received, the circuit 21 reads the source-node address of the frame from the reception buffer area and holds the source-node address. Further, the total number of subscribed nodes is increased by one, thus generating a new total number of subscribed nodes.

An Ethernet frame is prepared, which contains a subscription-accepting signal and new total number of subscribed nodes, both recorded in the specific field. The subscription-accepting signal, which is used as a specific control identifier, indicates the grant to the subscription request and the timing of transmitting frames. The new total number of subscribed nodes is used as a slot number, which will be notified. This subscription-accepting frame is transmitted to the station which has requested for subscription and which has the source-node address.

In the station which receives the subscription-accepting frame and which has transmitted the subscription-requesting signal, the input register circuit (IN-Reg) 21 receives a normal reception signal Gd-ACP and confirms that the frame has been normally received, if the subscription-accepting signal ACP supplied from the frame verifying circuit 30 indicates that the frame has been received. Further, the slot number value notified by the synchronous transmitting station and contained in the frame received is read out and set as the slot number value Slt-No of the station.

Step S14 (Backup of the Synchronous Transmitting Station):

The synchronous transmitting station may cease to function in the data transmitting system operation in on-line state. If this happens, another station of the data transmitting system is used as a synchronous transmitting station. Thus, the operative on-line state is shifted to an inoperative on-line state if no Ethernet containing a sync signal arrives even after a prescribed time has elapsed. In addition, the destination address is used as a specific multi cast address after the time set for the station has expired. An Ethernet frame having a sync signal contained in its specific field is transmitted. If the Ethernet frame is completely transmitted without colliding with any other frame in the transmission path, the station that has transmitted this Ethernet frame will be used as a new synchronous transmitting station.

That is, in any station other than the synchronous transmitting station, which stays in service, the on-line state signal On-line output from the state control circuit 10 becomes false when the node delay timer 11 generates a sync-signal absence detection signal SYN-Stall-Det. The transmission state control circuit 17 then generates a sync-signal transmission instructing signal Tx-SYS in response to a sync-signal absence signal SYS-Stall. A sync frame is thereby transmitted. As a result, the station will be used as a new synchronous transmitting station.

Process in the Network of FIG. 1C (Segment Separation in Ethernet Station and Real-Time Station):

FIG. 1C illustrates a data transmitting system comprising Ethernet stations and real-time stations. The Ethernet stations can transmit, receive and exchange Ethernet frames in accordance with the Ethernet standards. The real-time stations are provided on the transmission path, along with the Ethernet stations. In this data transmitting system, no collision occurs in principle, among the Ethernet stations connected to switching hub devices #1SW and #2SW. It is therefore impossible to inhibit the transmission of frames from any Ethernet station by detecting collisions as described above.

Consequently, frames may be transmitted from Ethernet stations at an unexpected timing in unexpected numbers. In this case, the frames transmitted from the Ethernet station will overlap the frames transmitted from the real-time stations through the switching hub devices #1SW and #2SW. If the switching hub devices #1SW and #2SW are over-loaded, the frames will be discarded, whichever transmitting station has transmitted them, an Ethernet station or a real-time station. Frames may be accumulated in the switching hub devices #1SW and #2SW. This may render it impossible for each real-time Ethernet station to transmit frames within a prescribed time or to transmit frames reliably.

To prevent this, each real-time station has at least one transmission path interface and at least one Ethernet interface. The transmission path interface connects the real-time station to the transmission path. The Ethernet interface works as a transmission path interface, connecting the real-time station to the transmission path to which the Ethernet stations are connected. In the first half of the transmission cycle, which is allocated to the real-time station, the Ethernet frame received from the real-time interface is relayed to the Ethernet interface. If no carriers exist in the transmission path to which the Ethernet stations are connected, the real-time interface transmits an Ethernet preamble signal to the Ethernet interface at an appropriate timing. The transmission of frames from the Ethernet station connected to the Ethernet interface is thereby inhibited. As a result, the first half cycle is realized in the same way as in the network configuration of FIGS. 1A and 1B.

In the second half cycle, the real-time interface does not generate the preamble or transmit the same to the Ethernet interface. Thus, the second half cycle is realized in the same way as in the network configuration of FIGS. 1A and 1B.

More precisely, the interface that connects the real-time stations to the transmission path is a circuit for supplying a reception signal Rec-In to the real-time station and receiving a transmission Tx-out from the real-time station. The interface that connects the Ethernet stations to the transmission path is a circuit for supplying a reception signal Erec-In to the Ethernet station and receiving a transmission Tx-out from the Ethernet station. These circuits comprise a the second receiving circuit (Rec2) 37, second decoder circuit (Dec2) 38, second collision detecting circuit (Cols-Det2) 39, second collision-signal generating circuit (Cols gen2) 40, detector circuit (Rstrt) 46, second encoder circuit (Enc2) 41, second transceiver circuit (Tcv2) 42 and first collision-signal generating circuit (Cols gen1) 43. The second collision-signal generating circuit 40 generates a preamble equivalent signal. The detector circuit 46 detects the start of the reception of frames. The first collision-signal generating circuit 43 generates a preamble equivalent signal.

In the first half cycle allocated to the real-time stations, wherein the subscription-accepting period signal Cycle-On remains false, the frame received from the real-time interface is relayed to the Ethernet interface, by virtue of the relay function of the repeater circuit (relay control circuit Reepeat-cntrl) 44. The repeater circuit 44 transmits the Ethernet preamble signal to the Ethernet interface in the case where the carrier detection signal Crs indicates that no carriers exist in the transmission path.

While the subscription-accepting period signal Cycle-On is true, the Ethernet preamble signal is not transmitted to the Ethernet interface. A signal-circulation preventing circuit (FI-Det) 45 is provided to output transmission inhibiting signals Rinh1 and Rinh2 when frame signals are relayed, in order to prevent the signals relayed from circulating to the transmission side. The signal Rinh1 is generated from the reception start signal Rvsrt supplied from the frame-detecting circuit 2. The signal Rinh2 is generated from the reception start signal Resrt supplied from the detector circuit 46.

The operations described above are carried out, thereby separating the segments of the real-time station and Ethernet station and extending these segments. For example, any real-time station can transmit frames even though any Ethernet station is transmitting frames, and the functions cannot be performed to maintain the cycle time transmitted from the synchronous transmitting station. This is because no collision occurs, in principle, among the stations that are connected to the switching hub devices. In the embodiment, the Ethernet stations are connected to the Ethernet interface provided in each real-time station. Hence, not only Ethernet stations and realtime stations can be provided, side by side, in the data transmitting system, but also the switching hub devices can increase the transmission distance.

That is, the present invention can be applied not only to bus-type Ethernets such as 10 Base-T and 100 Base-T, but also to star-type Ethernets using repeater hub devices and switching hub devices, such as 1 Gbps Etehrnet which will be developed soon.

The embodiment described above are advantageous in the following respects:

(1) Real-time stations can be provided, along with Ethernet devices, in a network. One of the stations, which is determined in accordance with the activation conditions, functions as a synchronous transmitting station, acquires, without fail, the frame transmission right during the cycle of the sync signal it transmits, and can transmit Ethernet packets.

(2) Any real-time station that has the frame transmission right can transmit Ethernet packets to the transmission path at any time. When the real-time station conflicts with any Ethernet station, the packets are caused to collide with the Ethernet packets transmitted from the Ethernet station, thereby stopping the transmission of packets from the Ethernet station. The period during which the real-time station can transmit packets can thereby be limited to a minimum outer-disturbance time, though the Ethernet devices are provided in the network.

(3) The timing of transmitting packets from one real-time station to any other real-time station can be controlled by the standard procedures, such as standard Ethernet protocols IP, TCP and UDP. Communication can be achieved not only among the real-time stations, but also between each real-time station and any Ethernet device incorporated in the network.

(4) The timing of transmitting data packets among the real-time stations can be controlled by the control signals contained in the data packets. Packets each containing control signals only need not be used at all. This helps to maintain the high use efficiency of the transmission path.

(5) Each real-time station incorporates a transmission time managing timer. The timer enables the real-time station to transmit packets within a predetermined time, without fail, and to transmit more packets if the amount of data the other real-time stations should transmit decreases.

(6) The real-time stations can be connected to the transmitting path comprising Ethernet devices that accord with the Ethernet standards and can be provided, along with the Ethernet stations. Therefore, the real-time stations and the Ethernet stations can constitute a real-time network in which each real-time station can not only exchange information with any Ethernet station, but also transmit frames within a predetermined time, not influenced by the communication among the Ethernet stations.

Second Embodiment

This embodiment is a modification of the data transmitting system of FIG. 1C, which is the first embodiment of the invention.

Figure 12:
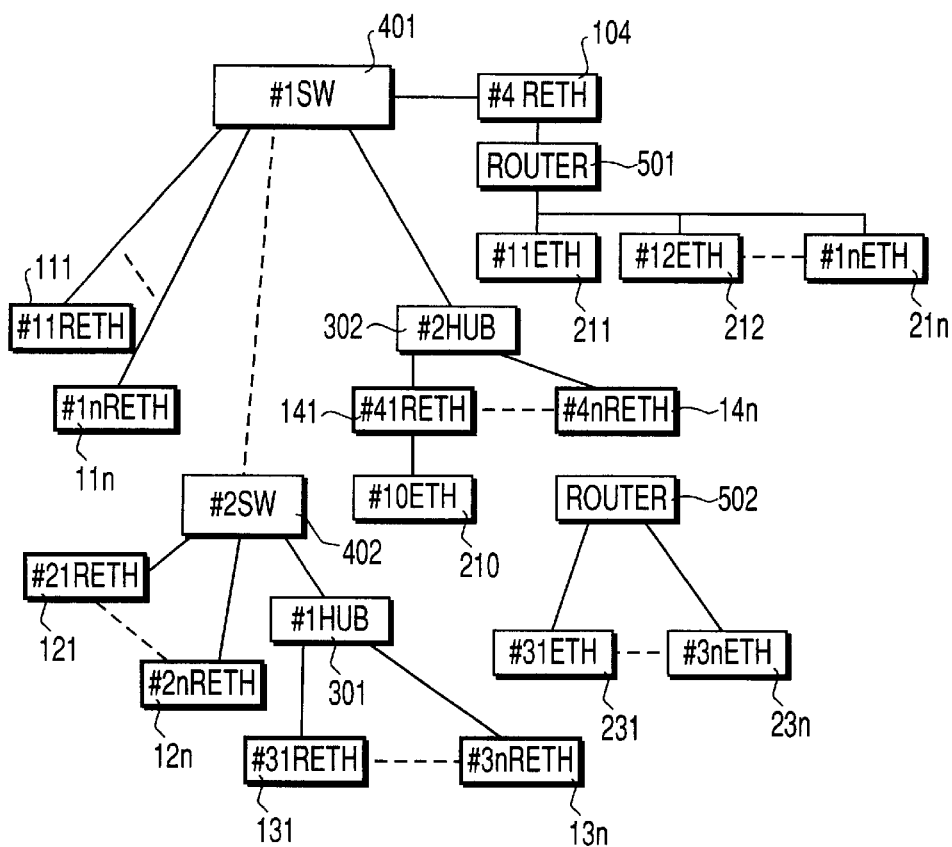
FIG. 12 is a diagram showing a network which incorporates the data transmitting system according to the invention and which is a combination of a bus-type network and a star-type type network.

FIG. 12 shows the data transmitting system according to the second embodiment.

The system shown in FIG. 12 comprises a RETH station 104, ETH stations 211 to 21n, and a router 501 provided between the RETH station 104, one the one hand, and the ETH stations 211 to 21n, on the other. A router 502 is provided in place of the hub 303 (FIG. 1C). Except for these points, the system is similar to the system shown in FIG. 1C in terms of node configuration. The second embodiment is different from the first embodiment in combination of nodes, but is similar thereto in the function of each station.

The routers 501 and 502 change the flow of packets (frames) in accordance with the destination. Each of the routers may have a buffer for storing the frames to be transmitted.

Since the data transmitting system is so constructed as described above, frames can be transmitted among the ETH stations 211 to 21n which constitute a network. The same holds true of the network, which is constituted by Ethernet stations 231 to 23n only.

That is, the transmitting path between the RETH station 104 and the router 501, both shown in FIG. 12, cannot be used due to the preamble signal transmitted from the real-time Ethernet interface of the ETH station 104, except for the case where frames are transmitted from the RETH station 104 to the router 501. Hence, no frames can be transmitted from the router 501 to the RETH station 104 in the first half cycle. However, the transmission path between the router 501 and each of the ETH stations 211 to 21n would not be occupied by the RETH station 104, because the preamble signal is valid in only that part of the transmission path which extends between the ETH station 104 and the router 501. Frames can therefore be transmitted among the ETH stations 211 to 21n, even in the first half cycle. This holds true for the RETH stations 14n, router 502 and ETH stations 231 to 23n.

In the second half cycle, each station can freely transmit Ethernet frames in the same manner as in the first embodiment.

In the data transmitting system according to the second embodiment, the network to which only the Ethernet stations are connected is connected by a router to the RETH stations. The second embodiment can therefore attain the same advantages as the first embodiment. In addition, the Ethernet stations connected to any router can transmit frames to one another even in the second half cycle.

Each embodiment described above is applied to Ethernet, but the present invention is not limited thereto. Rather, the invention can be applied to any communication system that fulfills the following requirements. First, each station monitors the transmission path do not transmit new signals if signals exist in the transmitting path, thereby to prevent collision of signals in the transmission path. Second, if the signal transmitted collides with other signals in the transmission path, despite the with the monitoring results, the signal is transmitted again at an appropriate timing and therefore prevented from colliding with any other signal in the transmission path. Such a communication system other than the Ethernet network system may be, for example, a CDMA radio communication system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transmitting apparatus corresponding to one of a plurality of data transmitting apparatuses constituting a specific network, said data transmitting apparatus comprising:
connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;
signal receiving means for receiving signals transmitted from the terminal or any one of the other data transmitting apparatus, said signals transmitted through the data transmitting path and having a data format that accords with the protocol;
transmission right acquisition means for determining, at a specific timing, whether the data transmitting apparatus has acquired transmission right that should be given cyclically in the specific network, from information representing an order in which the transmitting apparatuses of the specific network should acquire the transmission right; and
signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals from colliding again in the data transmission path.

2. A data transmitting apparatus according to claim 1, wherein the transmission right acquisition means determines whether the data transmitting apparatuses has acquired transmission right, from information representing the order in which the transmitting apparatuses of the specific network should acquire the transmission right, even when the signal receiving means receives a transmission-completion signal from any one of the other data transmitting apparatuses, and the signal transmitting means transmits the transmission-completion signal to all other data transmitting apparatuses, upon transmitting all signals that should be transmitted.

3. A data transmitting apparatus according to claim 2, further comprising monitoring means for determining whether the data transmitting apparatus that has output the transmission-completion signal has normally transmitted the signals, in accordance with source address contained in the transmission-completion signal and information representing the order in which at least one of the other data transmitting apparatuses should acquire the transmission right.

4. A data transmitting apparatus according to claim 1, wherein the signal transmitting means uses an Ethernet-standard protocol or an IEEE 802.3-standard protocol, as the protocol defining the format of the signals to be transmitted.

5. A data transmitting apparatus according to claim 4, wherein the signal transmitting means keeps transmitting a preamble signal as a signal to be transmitted to the data transmission path, and then transmits an Ethernet frame when the collision ceases to exist in the data transmitting path.

6. A data transmitting apparatus according to claim 5, wherein the signal transmitting means stops transmitting signals when the collision remains in the data transmission path even after the preamble signal has been transmitted for a predetermined time.

7. A data transmitting apparatus according to claim 1, wherein the signal transmitting means does not transmit signals when the data transmitting apparatus has the transmission right and fails to transmit all signals until the transmission timing of the data transmitting apparatus that is to acquire the transmission right.

8. A data transmitting apparatus according to claim 1, wherein the signal transmitting means transmits signals in accordance with the protocol when none of the other transmitting apparatuses of the specific network has the transmission right.

9. A data transmitting apparatus according to claim 1, wherein the transmission right acquisition means acquires the transmission right at least once until the next sync signal arrives, when the signal receiving means receives a sync signal that initiates the next cycle.

10. A data transmitting apparatus according to claim 9, wherein the signal transmitting means outputs the sync signal when the data transmitting apparatus remains in an activated state or when no devices connected to the communication system output the sync signal within a predetermined time, and cyclically supplies the sync signal to all other data transmitting apparatuses belonging to the specific network when the sync signal is completely transmitted without colliding with other signals in the data transmission path.

11. A data transmitting apparatus according to claim 10, wherein the signal transmitting means transmits no sync signals after the signal receiving means has received the sync signal and until the signal transmitting means is set into a predetermined condition, when the data transmitting apparatus remains in an activated state or when none of devices connected to the communication system outputs the sync signal within a predetermined time.

12. A data transmitting apparatus according to claim 10, wherein the transmission right acquisition means acquires the transmission right at the same time the data transmitting apparatus cyclically outputs, if any, a sync signal, and the signal transmitting means transmits a signal which should contain the sync signal and which contains a transmission-completion signal indicating that the transmission right should be shifted, to all other data transmitting apparatuses of the specific network when the data transmitting apparatus is in a state to output the sync signal cyclically and has no other signals to transmit.

13. A data transmitting apparatus according to claim 10, wherein the signal transmitting means transmits a signal containing a request for subscription to the network, to that one of the other data transmitting apparatuses that belong to the specific network, which cyclically transmits the sync signal, when the signal transmitting means does not belong to the network.

14. A data transmitting apparatus according to claim 10, wherein, when the data transmitting apparatus is in a state to output a sync signal cyclically and the signal receiving means receives a signal containing a request for subscription to the network, from a data transmitting apparatus not belonging to the specific network, the signal transmitting means outputs information representing the order in which the data transmitting apparatus not belonging to the specific network should acquire the transmission right, and continuously transmits the sync signal to the data transmitting apparatus not belonging to the specific network.

15. A data transmitting apparatus according to claim 1, wherein the signal transmitting means records at least a control identifier which accords with the protocol used in the specific network, in that field of the data format that accords with the protocol which defines a mode of processing signals to be transmitted.

16. A data transmitting apparatus according to claim 15, wherein the signal transmitting means uses an Ethernet-standard protocol or an IEEE 802.3-standard protocol, as the protocol defining the format of the signals to be transmitted, and records the control identifier in a Type field when the Ethernet-standard protocol is used or in an EthernetType field when the IEEE 802.3-standard protocol is used.

17. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a synch signal indicating a start of a cycle, a transmission-completion signal indicating transfer of the transmission right, or a request for subscription to the specific network, as the control identifier, in a field that defines a mode of processing the signals to be transmitted.

18. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a sync signal indicating a start of a cycle, as the control identifier, in a field that defines a mode of processing the signals to be transmitted, and records at least one of information showing the number of data transmitting apparatuses of the specific network and the identification of the specific network and the identification information of that data transmitting apparatus which outputs the sync signal, also in the field that defines the mode of processing the signals to be transmitted.

19. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a transmitting-completion signal indicating transfer of the transmission right, as the control identifier, in a field that defines a mode of processing the signals transmitted, and records information showing how many other data transmitting apparatuses have acquired the transmission right before the data transmitting apparatus acquires the transmission right, also in the field that defines a mode of processing the signals transmitted.

20. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a sync signal indicating a start of a cycle, as the control identifier, in a field that defines a mode of processing the signals to be transmitted, and records information showing the number of data transmitting apparatuses of the specific network, in a field of an option word contained in an IP protocol header.

21. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a sync signal indicating a start of a cycle, as the control identifier, in a field that defines a mode of processing the signals to be transmitted, and records, in a field of an option word contained in an IP protocol header, information showing how many other data transmitting apparatuses have acquired the transmission right before the data transmitting apparatus acquires the transmission right.

22. A data transmitting apparatus corresponding to one of a plurality of data transmitting apparatuses constituting a specific network, said data transmitting apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals to collide again in the data transmission path, wherein the signal transmitting means records at least a control identifier which accords with the protocol used in the specific network, in that field of the data format that accords with the protocol which defines a mode of processing signals to be transmitted, uses an Ethernet-standard protocol or an IEEE 802.3-standard protocol, as the protocol defining the format of the signals to be transmitted, and records the control identifier in a Type field when the EthernetType field when the IEEE 802.3-standard protocol is used, and records a signal control identifier indicating that the data transmitting apparatus should accord with the protocol used in the specific network, in the Type field or the EthernetType field, and records other information, if any, required to process frames in accordance with the protocol used in the specific network, in a field other than the Type filed or a field other than the EthernetType field.

23. A data transmitting apparatus corresponding to one of a plurality of data transmitting apparatuses constituting a specific network, said data transmitting apparatus comprising:

a connection section connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

a signal receiving section for receiving signals transmitted from the terminal or any one of the other data transmitting apparatus, said signals transmitted through the data transmitting path and having a data format that accords with the protocol;

a transmission right acquisition section for determining, at a specific timing, whether the data transmitting apparatus has acquired transmission right that should be given cyclically in the specific network, from information representing an order in which the transmitting apparatuses of the specific network should acquire the transmission right; and a signal transmitting section for transmitting signals to the data transmission path in the data format that accords with the protocol, for transmitting signals, no matter whether signals exist in the data transmitting path, when the transmission right acquisition section determines that said data transmitting apparatus has acquired the transmission right, and for continuously transmitting signals even before the period for preventing collision of signals has elapsed, even when collision of signals occurs in the data transmission path, in order to prevent the signals from colliding again in the data transmission path.

24. A network interface apparatus for use in one of a plurality of data transmitting apparatuses constituting a specific network, said network interface apparatus comprising:

connection means connected to a communication system including the specific network, said communication system being able to include a terminal which operates in accordance with a protocol to transmit no signals through a data transmission path while another signal is transmitted through the data transmission path, to stop transmitting a signal if the signal collides with other signals in the data transmission path, and to transmit the signal again after a period for preventing collision of signals has elapsed;

signal receiving means for receiving signals transmitted from the terminal or any one of the other data transmitting apparatus, said signals transmitted through the data transmitting path and having a data format that accords with the protocol;

transmission right acquisition means for determining, at a specific timing, whether the data transmitting apparatus has acquired transmission right that should be given cyclically in the specific network, from information representing an order in which the transmitting apparatuses of the specific network should acquire the transmission right; and signal transmitting means for transmitting signals to the data transmission path in the data format that accords with the protocol, for transmitting signals, no matter whether signals exist in the data transmitting path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals from colliding again in the data transmission path.

25. A data transmitting system comprising:

a data transmission path;

at least one terminal which operates in accordance with a protocol to transmit no signals while signals are transmitted through a data transmission path, to stop transmitting signals if the signals transmitted collide with other signals in the data transmission path, and to transmit the signals again after a period for preventing collision of signals has elapsed; and a plurality of data transmitting apparatuses, each comprising signal receiving means for receiving signals transmitted from the data transmission path in a data format that accords with the protocol, transmission right acquisition means for determining, at a specific timing, whether the data transmitting apparatus has acquired transmission right that should be given cyclically, from information representing an order in which the data transmitting apparatus should acquire the transmission right, and signal transmitting means for transmitting signals to the data transmission path in the data format that accords with the protocol, for transmitting signals, no matter whether signals exist in the data transmission path, when the transmission right acquisition means determines that said data transmitting apparatus has acquired the transmission right, and for continuously transmitting signals even before the period for preventing collision of signals has elapsed, even when collision of signals occurs in the data transmission path, in order to prevent the signals from colliding again in the data transmission path.

26. A data transmitting system according to claim 25, wherein none of the data transmitting apparatuses hold the transmission right for some time during said prescribed period, and the signal transmitting section of each of the data transmitting apparatuses transmits signals in accordance with the protocol when none of the data transmitting apparatuses hold the transmission right.

* * * * *

UNITED STATES PATENT AND TRADEMARK OFFICE
CERTIFICATE OF CORRECTION

PATENT NO. : 6,711,131 B1
DATED : March 23, 2004
INVENTOR(S) : Shiobara

It is certified that error appears in the above-identified patent and that said Letters Patent is hereby corrected as shown below:

<u>Column 42,</u>
Line 13, change "filed" to -- field --.

Signed and Sealed this

First Day of June, 2004

JON W. DUDAS
*Acting Director of the United States Patent and Trademark Office*